United States Patent
Hwang et al.

(10) Patent No.: US 11,357,095 B2
(45) Date of Patent: Jun. 7, 2022

(54) FAST-SWITCH UNDULATOR AND METHOD FOR POLARIZING ELECTRON BEAM

(71) Applicant: National Synchrotron Radiation Research Center, Hsinchu (TW)

(72) Inventors: Ching-Shiang Hwang, Hsinchu (TW); Sei-Da Chen, Hsinchu (TW); Ting-Yi Chung, Hsinchu (TW); Jyh-Chyuan Jan, Hsinchu (TW)

(73) Assignee: NATIONAL SYNCHROTRON RADIATION RESEARCH CENTER, Hsinchu (TW)

( * ) Notice: Subject to any disclaimer, the term of this patent is extended or adjusted under 35 U.S.C. 154(b) by 640 days.

(21) Appl. No.: 16/425,439

(22) Filed: May 29, 2019

(65) Prior Publication Data

US 2020/0352018 A1    Nov. 5, 2020

(30) Foreign Application Priority Data

May 3, 2019   (TW) ................. 108115466

(51) Int. Cl.
 *H05H 7/04*   (2006.01)
 *H05H 13/04*  (2006.01)
 *H01S 3/09*   (2006.01)

(52) U.S. Cl.
CPC ............ *H05H 7/04* (2013.01); *H01S 3/0903* (2013.01); *H05H 13/04* (2013.01); *H05H 2007/041* (2013.01)

(58) Field of Classification Search
CPC .... H05H 7/04; H05H 13/04; H05H 2007/041; H01S 3/0903
See application file for complete search history.

(56) References Cited

U.S. PATENT DOCUMENTS

2015/0255201 A1*  9/2015  Jeong .............. H01F 7/0221
                                                    335/306

* cited by examiner

*Primary Examiner* — Henry Luong
(74) *Attorney, Agent, or Firm* — Birch, Stewart, Kolasch & Birch, LLP

(57) ABSTRACT

An undulator is adapted to a synchrotron storage ring or free electron lasers (FEL), especially to an undulator capable of switching polarization mode rapidly. In comparison with the EPU (elliptically polarized undulator) of APPLE II (Advanced Planar Polarized Light Emitter II) which conceived by Dr. S. Sasaki, the provided undulator does not use mechanical transmission mechanisms to drive the four magnetic pole arrays composed of permanent magnets. Hence, the polarization mode can be switched rapidly. Moreover, a polarization method of electron beam is also provided.

10 Claims, 27 Drawing Sheets

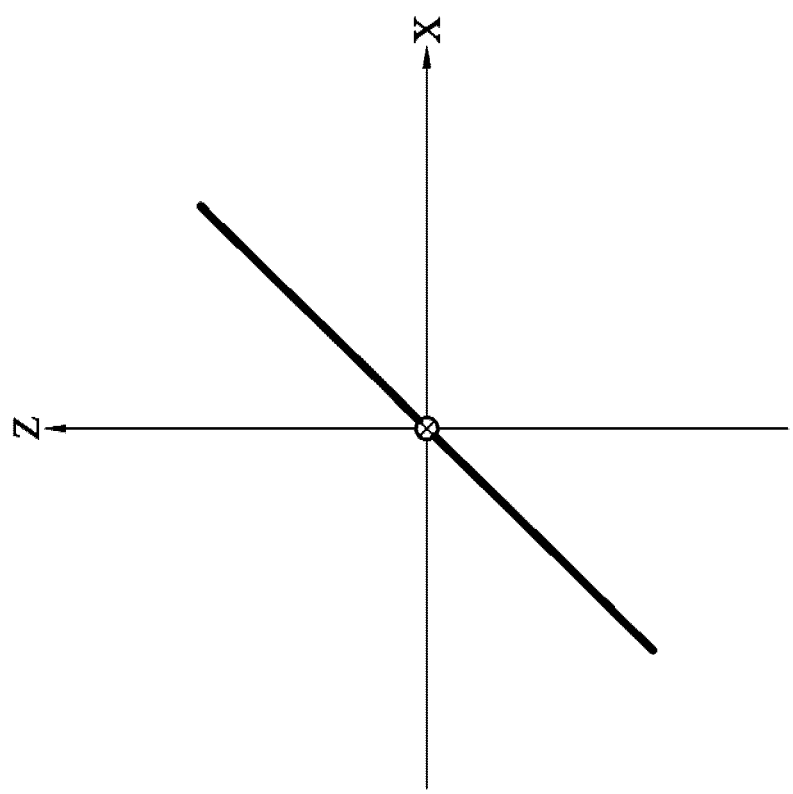

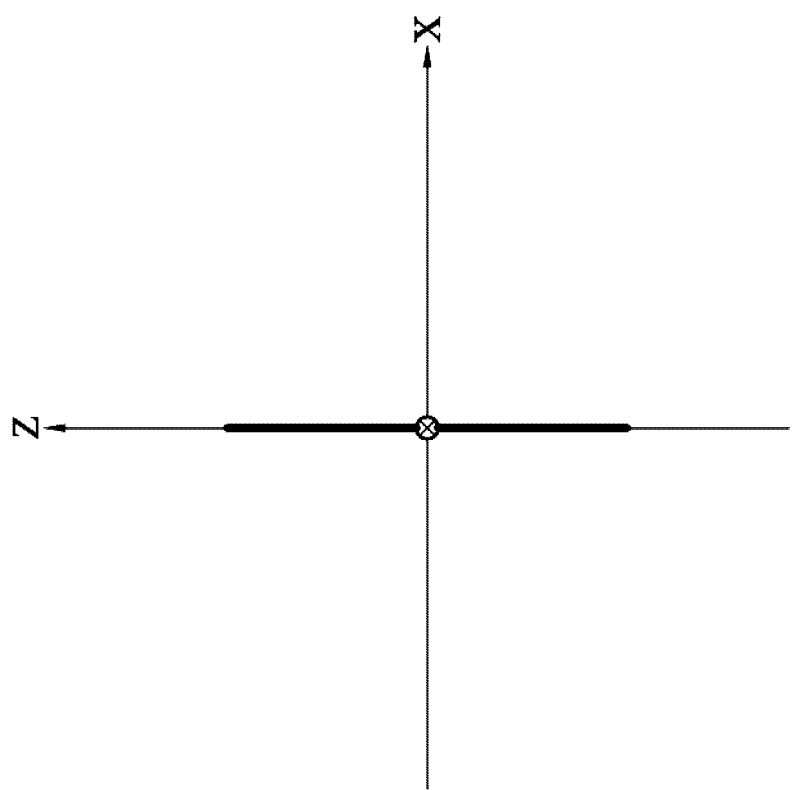

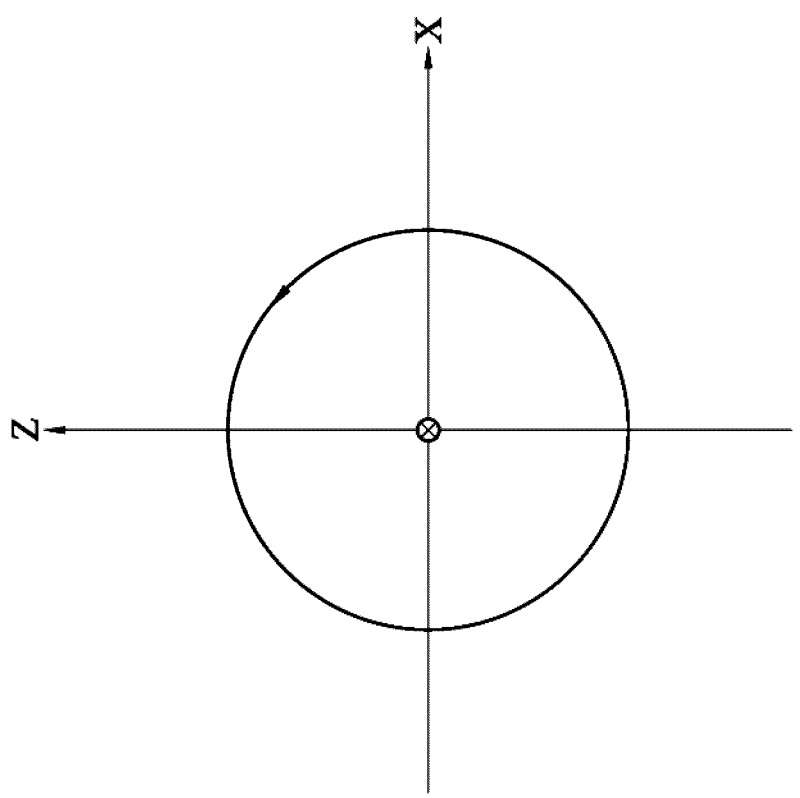

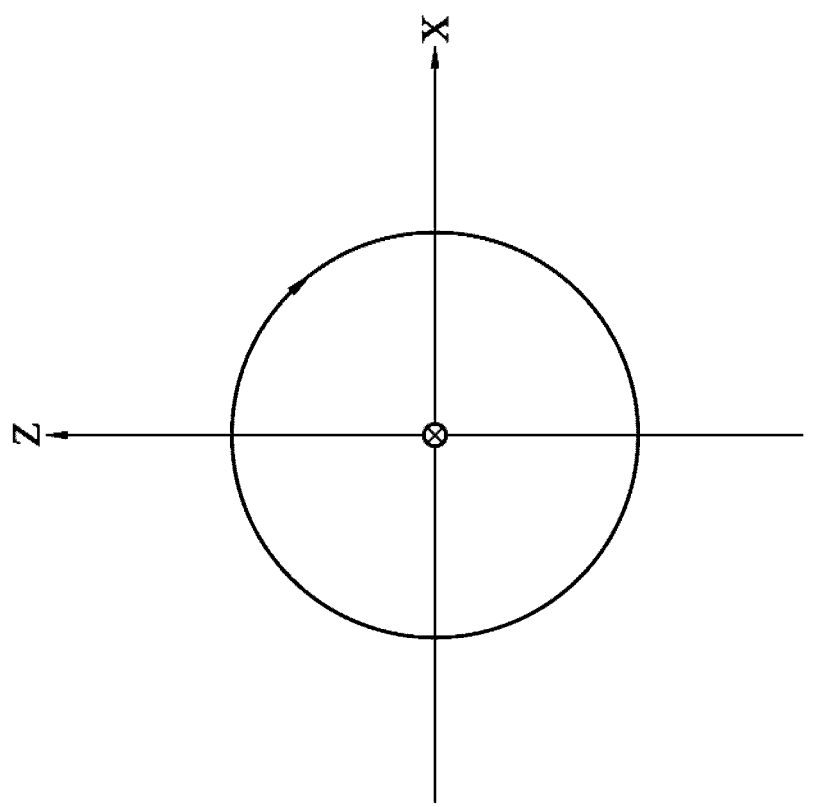

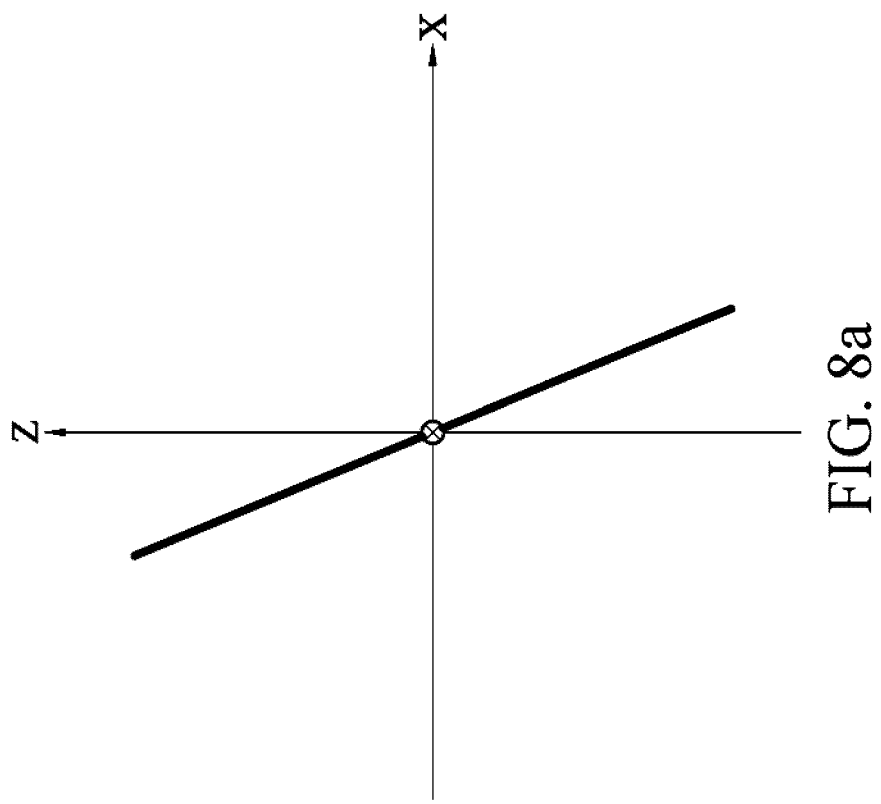

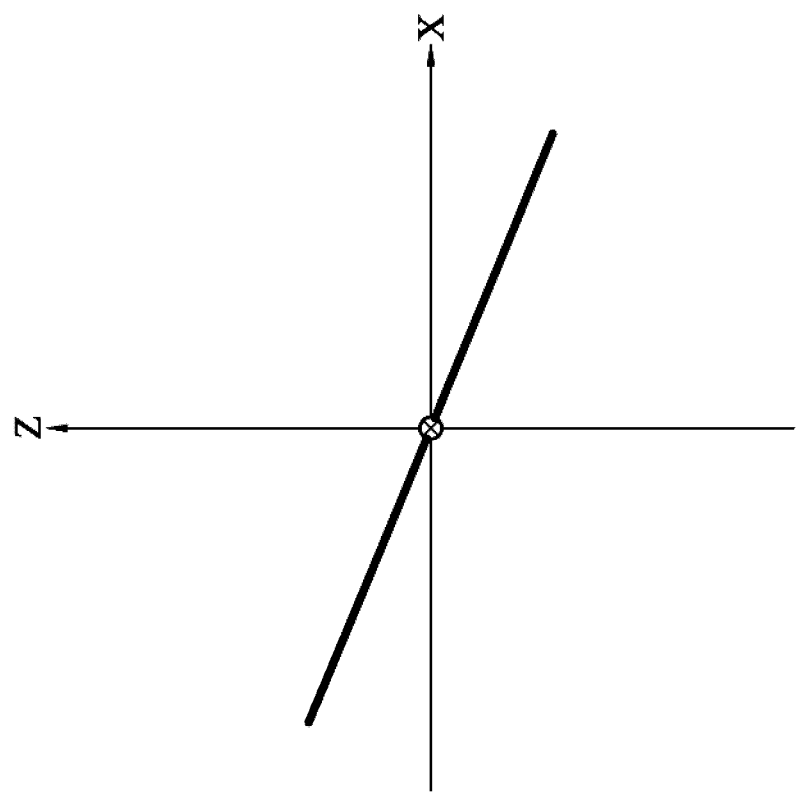

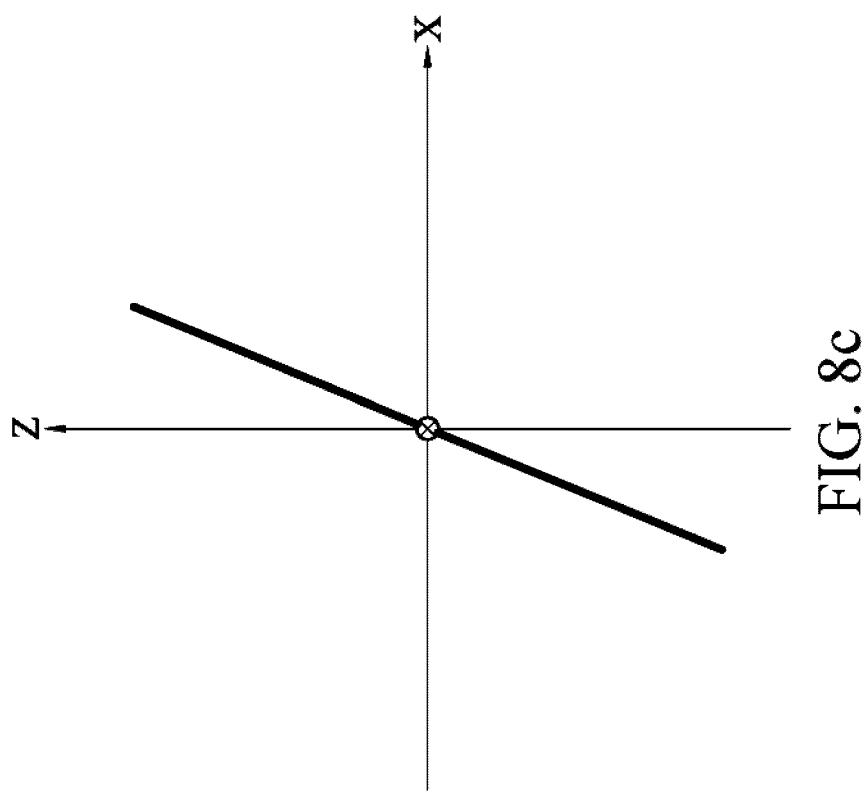

FAST-SWITCH UNDULATOR AND METHOD FOR POLARIZING ELECTRON BEAM

CROSS-REFERENCE TO RELATED APPLICATION

This non-provisional application claims priority under 35 U.S.C. § 119(a) to Patent Application No. 108115466 in Taiwan, R.O.C. on May 3, 2019, the entire contents of which are hereby incorporated by reference.

BACKGROUND

Technical Field

The present invention relates to an undulator and a method for polarizing an electron beam, and in particular, to an undulator and a method for polarizing an electron beam that can fast switch polarizing directions.

Related Art

Light sources of left and right-handed circularly polarized light are quite important to research on a magnetic material. Therefore, after the academician Jiande Chen developed a soft-x ray Magnetic Circular Dichroism [1] (XMCD for short) method in America, the research on the magnetic material is more booming. Particularly in the field of synchrotron radiation, increasing magnetic material research scientists start to be devoted to the field in this aspect. However, good left and right-handed circularly polarized light sources and a good polarization rate are required for working on the research in this aspect.

Currently, in the field of synchrotron radiation, various types of magnet materials are used to generate polarized light sources. An elliptically Polarized Undulator (EPU) that is put forward by a Japanese doctor, S. Sasaki and that is of an advanced planar polarized light emitter (APPLE II) structure is most widely used. The APPLE II EPU structure may provide a high luminous flux and a circular polarization rate close to 1, and an energy adjustable range is very wide. Therefore, since 1997, accelerator light source facilities of various countries started to manufacture and mount the APPLE II EPU to provide circularly polarized light, for example, international famous facilities such as a NSRRC, an ESRF, a MAX-IV, an ALS, an APS, a ELETTRA, a BESSYII, an SLS, a Diamond, an ALBA, a SOLEIL, and a SSRF.

The APPLE II EPU structure may provide various polarized light modes, including (1) a linear mode-horizontal and vertical, (2) a circular mode-right-hand and left-hand, and (3) linear incline mode-angles of +45 degrees and −45 degrees. Most requirements of current research are mainly fast switch between four types polarized lights in linear mode, circular mode, and the like. When polarization features of the magnetic material in different angles need to be learned, the linear incline mode between angles of 45(−45) degrees that is provided by the APPLE II EPU structure may be used to measure a related magnetic feature of the magnetic material (otherwise, linearly polarized light in different angles on a sample needs to be changed by rotating an angle of an experimental station, but rotating the experimental station to perform the experiment is a quite difficult and excessively enormous project). The APPLE II EPU includes four magnetic pole arrays of four pure magnet structures. The APPLE II EPU may change a phase and the magnitude of the magnetic field by changing relative displacement and magnetic gaps between the four groups of magnetic pole arrays, thereby changing a polarized light mode by changing the phase. However, changing the phase and the magnetic gaps needs to use an eight-axle mechanical transmission mechanism, and a magnetic force is very large. Therefore, by using a current technology, a phase shift frequency can reach only approximately 0.5 Hz or less. To be specific, when a polarized light mode needs to be switched from being left-hand to being right-hand, approximately two seconds needs to be waited. Therefore, though the APPLE II EPU has advantages of high brightness, the high circular polarization rate, and the wide energy adjustable range, because switching between different polarized light is too slow, a measurement condition of high precision (0.1% or even 0.01%) and high resolution cannot be reached. Particularly a soft-x ray XMCD signal is usually very small. Therefore, switching between left and right-handed polarized light needs to be faster to be better, so that a problem of unreliability of data measured for the left and right-handed polarized light due to instability of an electron beam in a storage ring can be avoided.

SUMMARY

One concept of the present invention is an undulator, applicable to polarizing an electron beam that travels through an electron beam passage. The undulator includes a first magnetic pole array, a second magnetic pole array, a third magnetic pole array, and a fourth magnetic pole array that are parallel to each other and that surround the electron beam passage together. The first magnetic pole array is disposed at a periphery of the electron beam passage along an extension direction of the electron beam passage. The first magnetic pole array includes a plurality of first odd-numbered sequence coils and a plurality of first even-numbered sequence coils. The first odd-numbered sequence coils and the first even-numbered sequence coils are disposed along the extension direction of the electron beam passage in a staggered manner and spaced away from each other, winding directions of two neighboring first odd-numbered sequence coils are opposite, and winding directions of two neighboring first even-numbered sequence coils are opposite. The second magnetic pole array is disposed at the periphery of the electron beam passage along the extension direction of the electron beam passage. The second magnetic pole array includes a plurality of second odd-numbered sequence coils and a plurality of second even-numbered sequence coils. The second odd-numbered sequence coils and the second even-numbered sequence coils are disposed along the extension direction of the electron beam passage in a staggered manner and spaced away from each other, winding directions of two neighboring second odd-numbered sequence coils are opposite, and winding directions of two neighboring second even-numbered sequence coils are opposite. The third magnetic pole array is disposed at the periphery of the electron beam passage along the extension direction of the electron beam passage. The third magnetic pole array includes a plurality of third odd-numbered sequence coils and a plurality of third even-numbered sequence coils. The third odd-numbered sequence coils and the third even-numbered sequence coils are disposed along a Y-axis direction in a staggered manner and spaced away from each other, winding directions of two neighboring third odd-numbered sequence coils are opposite, and winding directions of two neighboring third even-numbered sequence coils are opposite. The fourth magnetic pole array is disposed at the periphery of the electron beam passage along the extension direction of the electron beam passage. The fourth magnetic pole array includes a plurality of fourth odd-numbered sequence coils and a plurality of fourth even-numbered sequence coils. The fourth odd-numbered sequence coils and the fourth even-numbered sequence coils are disposed along the extension direction of the electron beam passage in a staggered manner and spaced away from each other, winding directions of two neighboring fourth odd-numbered sequence coils are opposite, and winding directions of two neighboring fourth even-numbered sequence coils are opposite.

Another concept of the present invention is method for polarizing an electron beam. The method is applicable to polarizing an electron beam that travels through an electron beam passage, and includes the following steps: disposing four magnetic field generators around a periphery of the electron beam passage, where each magnetic field generator includes a plurality of the odd-numbered sequence magnetic field sources and a plurality of the even-numbered sequence magnetic field sources, and the odd-numbered sequence magnetic field sources and the even-numbered sequence magnetic field sources are disposed along an extension direction of the electron beam passage in a staggered manner and spaced away from each other; making current directions of two neighboring odd-numbered sequence magnetic field sources of each magnetic field generator opposite to each other, and making current directions of two neighboring even-numbered sequence magnetic field sources of the magnetic field generator also opposite to each other; and polarizing, by controlling on or off of the odd-numbered sequence magnetic field sources and the even-numbered sequence magnetic field sources of each magnetic field generator, the electron beam that travels through the electron beam passage.

In conclusion, one feature of the undulator in the present invention is overcoming a disadvantage of an APPLE II EPU, so that when an electron beam in a storage ring travels through the undulator, the undulator is made to apply a horizontal magnetic field and/or a vertical magnetic field on the electron beam at a specific time point only by controlling power-on or power-off of coils of each magnetic pole array of the undulator, so that the undulator can fast switch various polarization modes, such as left-hand circular polarization/left-hand elliptical polarization, right-hand circular polarization/right-hand elliptical polarization, horizontal linear polarization, vertical linear polarization, 135° inclined linear polarization, and 45° inclined linear polarization, on the electron beam without needing of operation of any mechanical structures.

BRIEF DESCRIPTION OF THE DRAWINGS

FIG. 3c is a schematic diagram of a track of an end of a magnetic field vector of 45° inclined linear polarization;

FIG. 5c is a schematic diagram of a track of an end of a magnetic field vector of vertical linear polarization;

FIG. 6e is a schematic diagram of a track of an end of a magnetic field vector of left-hand circular polarization;

FIG. 7e is a schematic diagram of a track of an end of a magnetic field vector of right-hand circular polarization;

FIG. 8a is a schematic diagram of inclined linear polarization of an inclined angle greater than 90° but less than 135°;

FIG. 8b is a schematic diagram of inclined linear polarization of an inclined angle greater than 135° but less than 180°;

FIG. 8c is a schematic diagram of inclined linear polarization of an inclined angle greater than 45° but less than 90°.

DETAILED DESCRIPTION

A hardware configuration of an embodiment of an undulator in the present invention is first described below, and how to perform 45° inclined linear polarization, 135° inclined linear polarization, vertical linear polarization, horizontal linear polarization, left-hand circular polarization/left-hand elliptical polarization, and right-hand circular polarization/right-hand elliptical polarization on an electron beam by using the undulator is subsequently described.

Figure 1:
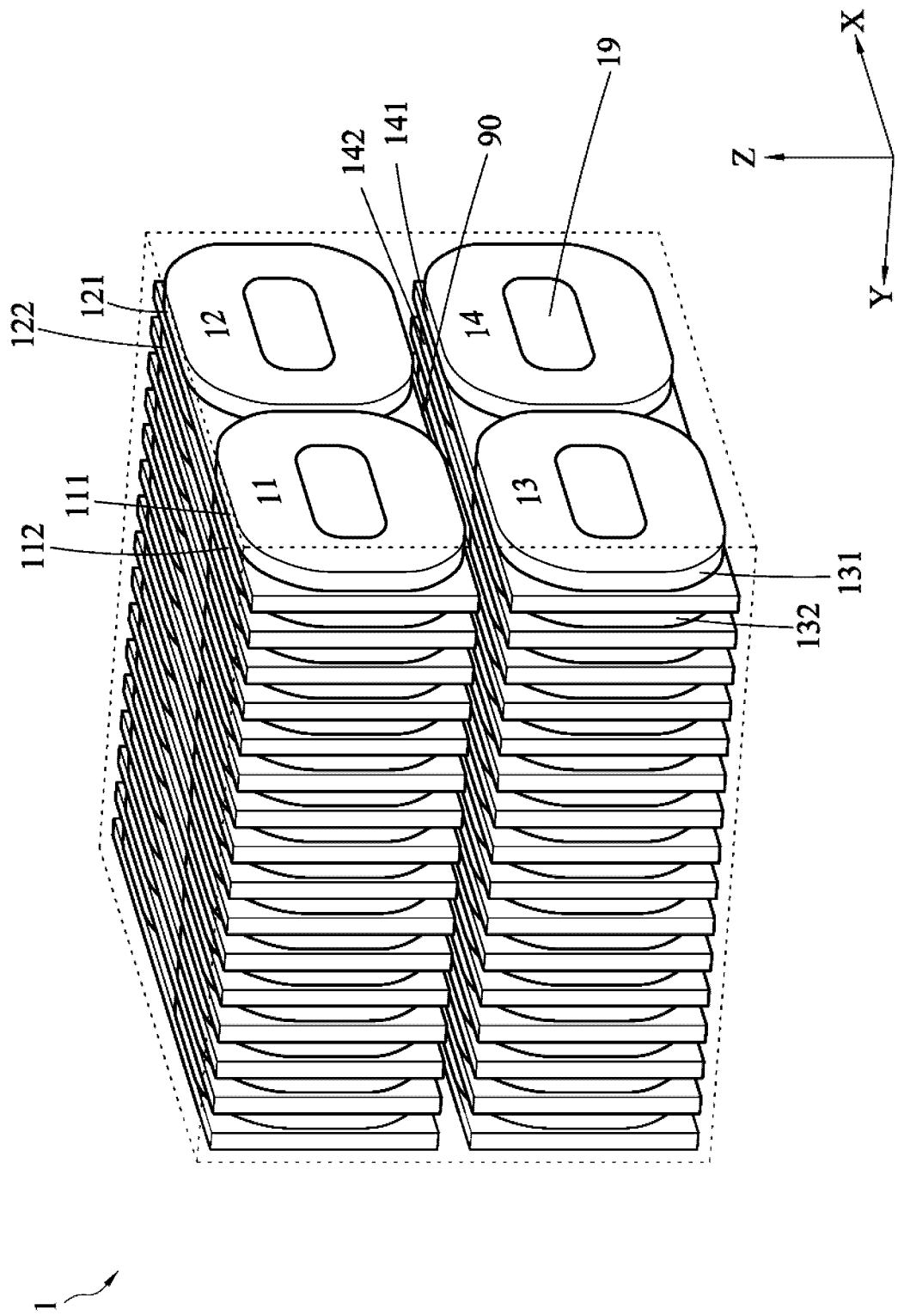
FIG. 1 is a schematic diagram of an example of an undulator according to the present invention.

FIG. 1 is a schematic diagram of the embodiment of the undulator according to the present invention. The undulator 1 shown in FIG. 1 is applicable to polarizing an electron beam that travels through an electron beam passage 90. The undulator 1 mainly includes a first magnetic pole array 11, a second magnetic pole array 12, a third magnetic pole array 13, and a fourth magnetic pole array 14 that are parallel to each other and that surround the electron beam passage 90 together. An extension direction of the electron beam passage 90 is defined as a Y-axis direction herein. It should be particularly noted herein that a person of ordinary skill in the art should understand that the extension direction of the electron beam passage 90 may also be defined as an X-axis direction or a Z-axis direction. A difference is only that selected spatial orientations of a coordinate system are different. In addition, "a forward current" in the specification refers to a counterclockwise direction in the figure, and "a reverse current" refers to a clockwise direction in the figure.

To continue, the first magnetic pole array 11, the second magnetic pole array 12, the third magnetic pole array 13, and the fourth magnetic pole array 14 are disposed around a periphery of the electron beam passage 90 along the Y-axis direction in FIG. 1. The first magnetic pole array 11 includes a plurality of first odd-numbered sequence coils 111 and a plurality of first even-numbered sequence coils 112. The first odd-numbered sequence coils 111 and the first even-numbered sequence coils 112 are disposed along the Y-axis direction in a staggered manner and spaced away from each other. Winding directions of two neighboring first odd-numbered sequence coils 111 are opposite, and winding directions of two neighboring first even-numbered sequence coils 112 are also opposite. A winding direction of a first first odd-numbered sequence coil 111 is the same as that of a first first even-numbered sequence coil 112.

It should be particularly noted that "disposed in a staggered manner and spaced away from each other" in this embodiment means that one even-numbered sequence coil (for example, the first even-numbered sequence coil 112) is disposed between two neighboring odd-numbered sequence coils (for example, the two neighboring first odd-numbered sequence coils 111), and one odd-numbered sequence coil (for example, the first odd-numbered sequence coil 111) is disposed between two neighboring even-numbered sequence coils (for example, the two neighboring first even-numbered sequence coils 112).

The second magnetic pole array 12 includes a plurality of second odd-numbered sequence coils 121 and a plurality of second even-numbered sequence coils 122. The second odd-numbered sequence coils 121 and the second even-numbered sequence coils 122 are disposed along the Y-axis direction in a staggered manner and spaced away from each other, winding directions of two neighboring second odd-numbered sequence coils 121 are opposite, and winding directions of two neighboring second even-numbered sequence coils 122 are also opposite. A winding direction of a first second odd-numbered sequence coil 121 is the same as that of a first second even-numbered sequence coil 122.

The third magnetic pole array 13 includes a plurality of third odd-numbered sequence coils 131 and a plurality of third even-numbered sequence coils 132. The third odd-numbered sequence coils 131 and the third even-numbered sequence coils 132 are disposed along the Y-axis direction in a staggered manner and spaced away from each other, winding directions of two neighboring third odd-numbered sequence coils 131 are opposite, and winding directions of two neighboring third even-numbered sequence coils 132 are also opposite. A winding direction of a first third odd-numbered sequence coil 131 is the same as that of a first third even-numbered sequence coil 132.

The fourth magnetic pole array 14 includes a plurality of fourth odd-numbered sequence coils 141 and a plurality of fourth even-numbered sequence coils 142. The fourth odd-numbered sequence coils 141 and the fourth even-numbered sequence coils 142 are disposed along the Y-axis direction in a staggered manner and spaced away from each other, winding directions of two neighboring fourth odd-numbered sequence coils 141 are opposite, and winding directions of two neighboring fourth even-numbered sequence coils 142 are also opposite. A winding direction of a first fourth odd-numbered sequence coil 141 is the same as that of a first fourth even-numbered sequence coil 142.

In an embodiment, each magnetic pole array of the undulator 1 includes 24 coils, to be specific, includes 12 odd-numbered sequence coils and 12 even-numbered sequence coils. Every four coils is defined as a polarization period. To be specific, when passing through two odd-numbered sequence coils and two even-numbered sequence coils, the electron beam is polarized by the undulator 1 in preset polarization mode once. Therefore, when passing through the undulator 1 in this embodiment, the electron beam is polarized for six times in total.

The following sequentially describes how to perform various polarization on an electron beam e by using the undulator 1.

135° inclined linear polarization: When a traveling direction of the electron beam e is defined as the Y-axis direction, assuming that an X-axis direction magnetic field and a Z-axis direction magnetic field that vary with time are respectively $B_X$ and $B_Z$, a condition of the 135° inclined linear polarization is $B_Z=B_X$, and a phase difference $\Delta\phi$ between $B_X$ and $B_Z$ is zero, namely, in phase. To make the electron beam e meet the foregoing condition after passing through the undulator 1, the undulator 1 may be set as follows:

(1) the first magnetic pole array 11: the first odd-numbered sequence coils 111 are de-energized; and the first even-numbered sequence coils 112 are de-energized;

(2) the second magnetic pole array 12: the second odd-numbered sequence coils 121 are energized with a forward current; and the second even-numbered sequence coils 122 are energized with the forward current;

(3) the third magnetic pole array 13: the third odd-numbered sequence coils 131 are energized with a reverse current; and the third even-numbered sequence coils 132 are energized with the reverse current; and (4) the fourth magnetic pole array 14: the fourth odd-numbered sequence coils 141 are de-energized; and the fourth even-numbered sequence coils 142 are de-energized.

Figure 2A:
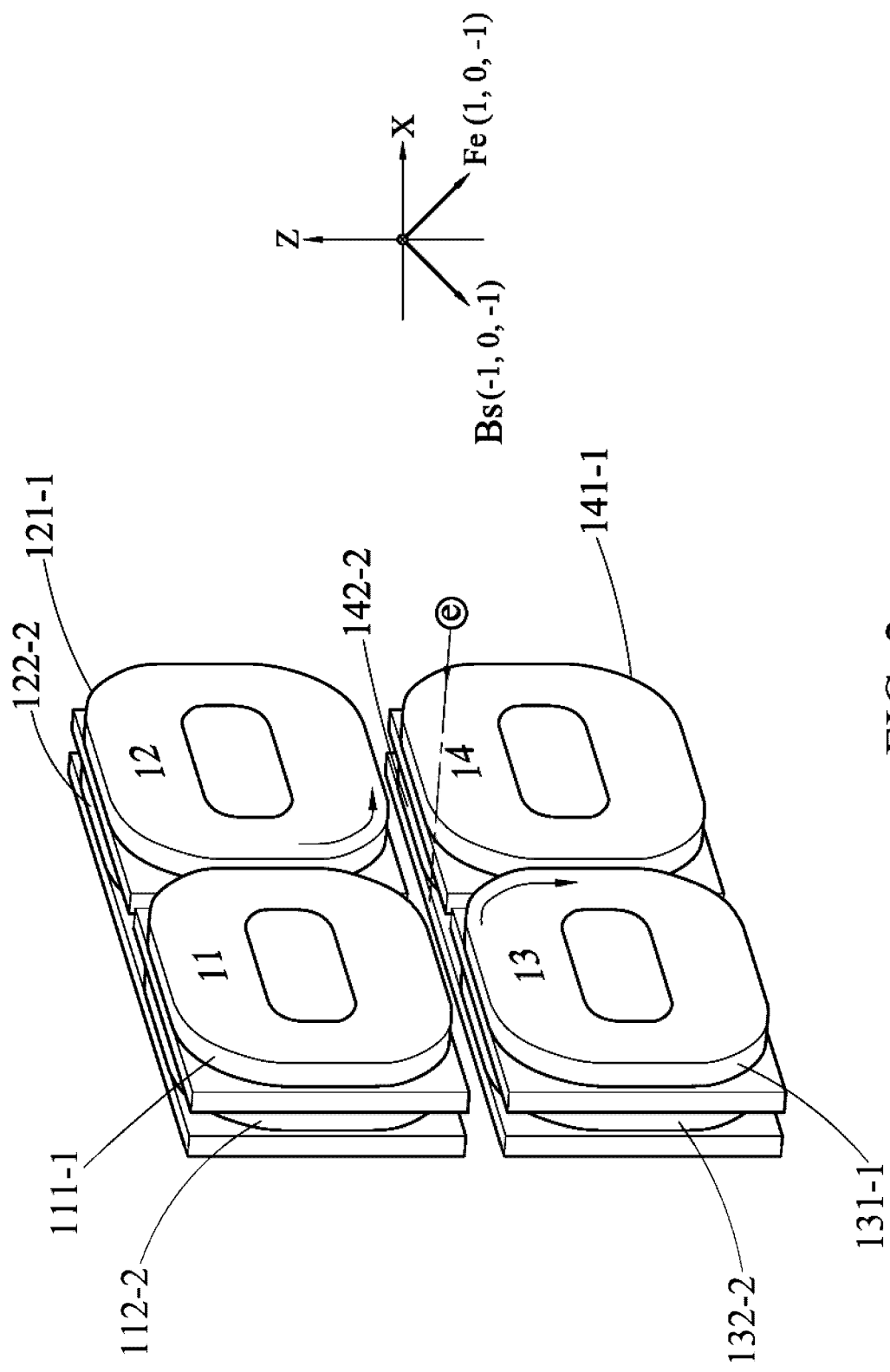
FIG. 2a is a first schematic diagram of 135° inclined linear polarization.

Referring to FIG. 2a, the undulator 1 is set as the above so that the second odd-numbered sequence coil 121-1 and the third odd-numbered sequence coil 131-1 generate current directions indicated by arrows (where 1 following the element symbol 111 refers to the first coil of the first magnetic pole array 11, 1 following the element symbol 121 refers to the first coil of the second magnetic pole array 12, 1 following the element symbol 131 refers to the first coil of the third magnetic pole array 13, 1 following the element symbol 141 refers to the first coil of the fourth magnetic pole array 14, and so on). Similarly, a current direction of a second even-numbered sequence coil 122-2 is consistent with that of the second odd-numbered sequence coil 121-1, and a current direction of a third even-numbered sequence coil 132-2 is also consistent with that of the third odd-numbered sequence coil 131-1.

In this case, a direction of a vector sum Bs of a magnetic field established by the first coils (121-1 and 131-1) of the second magnetic pole array 12 and the third magnetic pole array 13 is (−1, 0, −1). Bs may be decomposed into the X direction magnetic field (referred to as Bx below) and the Z direction magnetic field (referred to as Bz below). Bx and Bz have same magnitudes and are in phase. According to an electromagnetics theory, a force F to which a charged particle (a positively charged particle) is subject when the particle passes through a magnetic field meet a Lorentz force equation, namely, $F=q(E+v\times B)$. In embodiments discussed in the specification, the electron beam e is not subject to an applied electric field E. Therefore the formula may be simplified as Fe=−q(v×B). $F_e$ is a force to which an electron is subject when the electron passes through a magnetic field, q is an amount of charge of the electron, v is speed of the electron, B is the magnetic field to which the electron is subject, the minus sign indicates that the electron negatively charged. In addition, the embodiments discussed in the specification of the patent only need to consider a direction of the force to which the electron is subject when the electron passes through the magnetic field rather than need to consider a magnitude of the force to which the electron is actually subject. Therefore, in the foregoing formula, a value of q may be omitted, the speed v and the magnetic field B only need to take a value of a unit vector. When the electron beam e (where for convenience of expression, in the figure, the electron beam is expressed by using only one electron e) enters the first coils of the magnetic pole arrays along the electron beam passage 90, Fe=−[(0, 1, 0)×(−1, 0, −1)=(1, 0, −1). To be specific, the electron beam e is polarized along a direction of Fe (1, 0, −1).

Similarly, a direction of a vector sum Bs of a magnetic field established by the second coils (122-2 and 132-2) of the second magnetic pole array 12 and the third magnetic pole array 13 is also (−1, 0, −1). Therefore, the electron beam e is still polarized along the direction of (1, 0, −1) when the electron beam e travels through the second coils of the second magnetic pole array 12 and the third magnetic pole array 13.

Figure 2B:
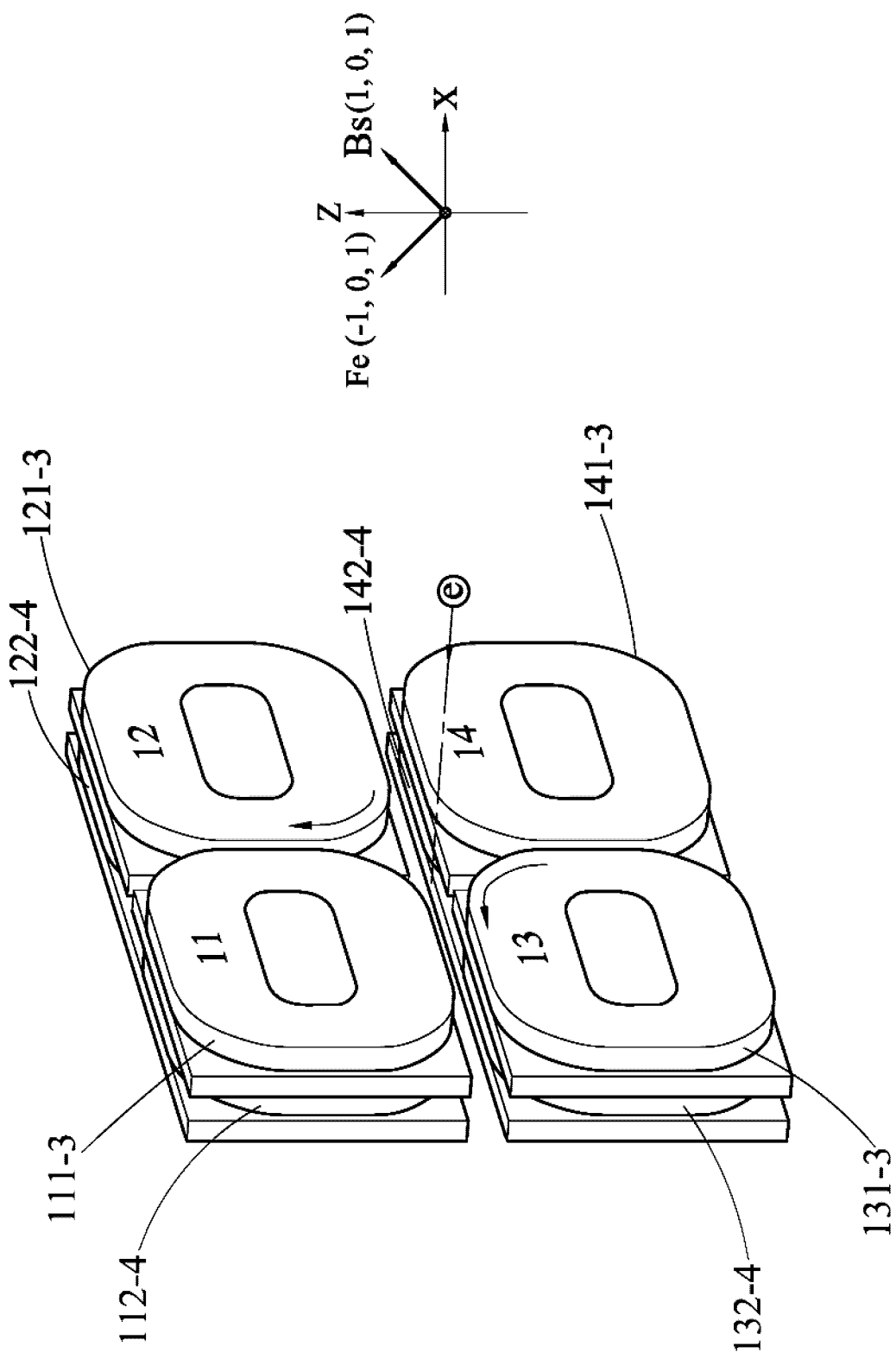
FIG. 2b is a second schematic diagram of 135° inclined linear polarization.

Further referring to FIG. 2b, a direction of a vector sum Bs of a magnetic field established by third coils (121-3 and 131-3) of the second magnetic pole array 12 and the third magnetic pole array 13 is (1, 0, 1). Once the electron beam e passes through second coils of the magnetic pole arrays, the electron beam e is not subject to a magnetic field in (−1, 0, −1) any longer but subject to a magnetic field in the direction of (1, 0, 1). In this case, $F_e$=[(0, 1, 0)×(1, 0, 1)=(−1, 0, 1). Therefore, the electron beam e is polarized along the direction of (−1, 0, 1) when the electron beam e travels through the third coils of the second magnetic pole array 12 and the third magnetic pole array 13.

Similarly, a direction of a vector sum Bs of a magnetic field established by fourth coils (122-4 and 132-4) of the second magnetic pole array 12 and the third magnetic pole array 13 is also (1, 0, 1). Therefore, the electron beam e is still polarized along the direction of (−1, 0, 1) when the electron beam e travels through the fourth coils of the second magnetic pole array 12 and the third magnetic pole array 13.

Figure 2C:
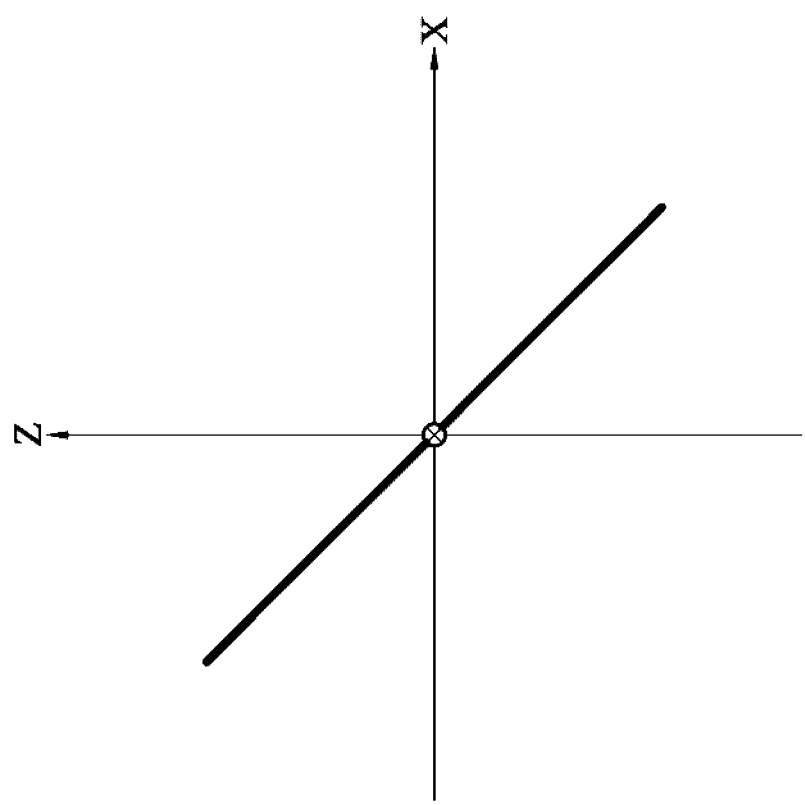
FIG. 2c is a schematic diagram of a track of an end of a magnetic field vector of 135° inclined linear polarization.

To this point, the electron beam e has passed through one periodical length of the undulator 1. Subsequently, each time the electron beam e passes through the four coils of the magnetic pole arrays, the electron beam e repeatedly goes through the foregoing polarization process. When the electron beam e completely passes through the undulator 1, the electron beam e is polarized for six times in total. When facing the electron beam e, an observer may observe a traveling track of the electron beam e as shown in FIG. 2c and 135° inclined linear polarization is presented.

In a polarization mode related to this embodiment and various subsequently discussed polarization modes, for each polarization period, a time point when the electron beam e exactly reaches the first coils of the magnetic pole arrays is used as a starting point, and a time point when the electron beam e exactly completely passes through fourth coils (or exactly reaches fifth coils) is used as an end point of the period. In addition, vectors in the figure indicate only directions rather than magnitudes.

45° inclined linear polarization: When a traveling direction of the electron beam e is defined as the Y-axis direction, a condition of the 45° inclined linear polarization is $B_Z=B_X$, and a phase difference Δϕ between $B_X$ and $B_Z$ is zero, namely, in phase. To make the electron beam e meet the foregoing condition after passing through the undulator 1, the undulator 1 may be set as follows:

(1) the first magnetic pole array 11: the first odd-numbered sequence coils 111 are energized with a forward current; and the first even-numbered sequence coils 112 are energized with the forward current;

(2) the second magnetic pole array 12: the second odd-numbered sequence coils 121 are de-energized; and the second even-numbered sequence coils 122 are de-energized;

(3) the third magnetic pole array 13: the third odd-numbered sequence coils 131 are de-energized; and the third even-numbered sequence coils 132 are de-energized; and (4) the fourth magnetic pole array 14: the fourth odd-numbered sequence coils 141 are energized with a reverse current; and the fourth even-numbered sequence coils 142 are energized with the reverse current.

Figure 3A:
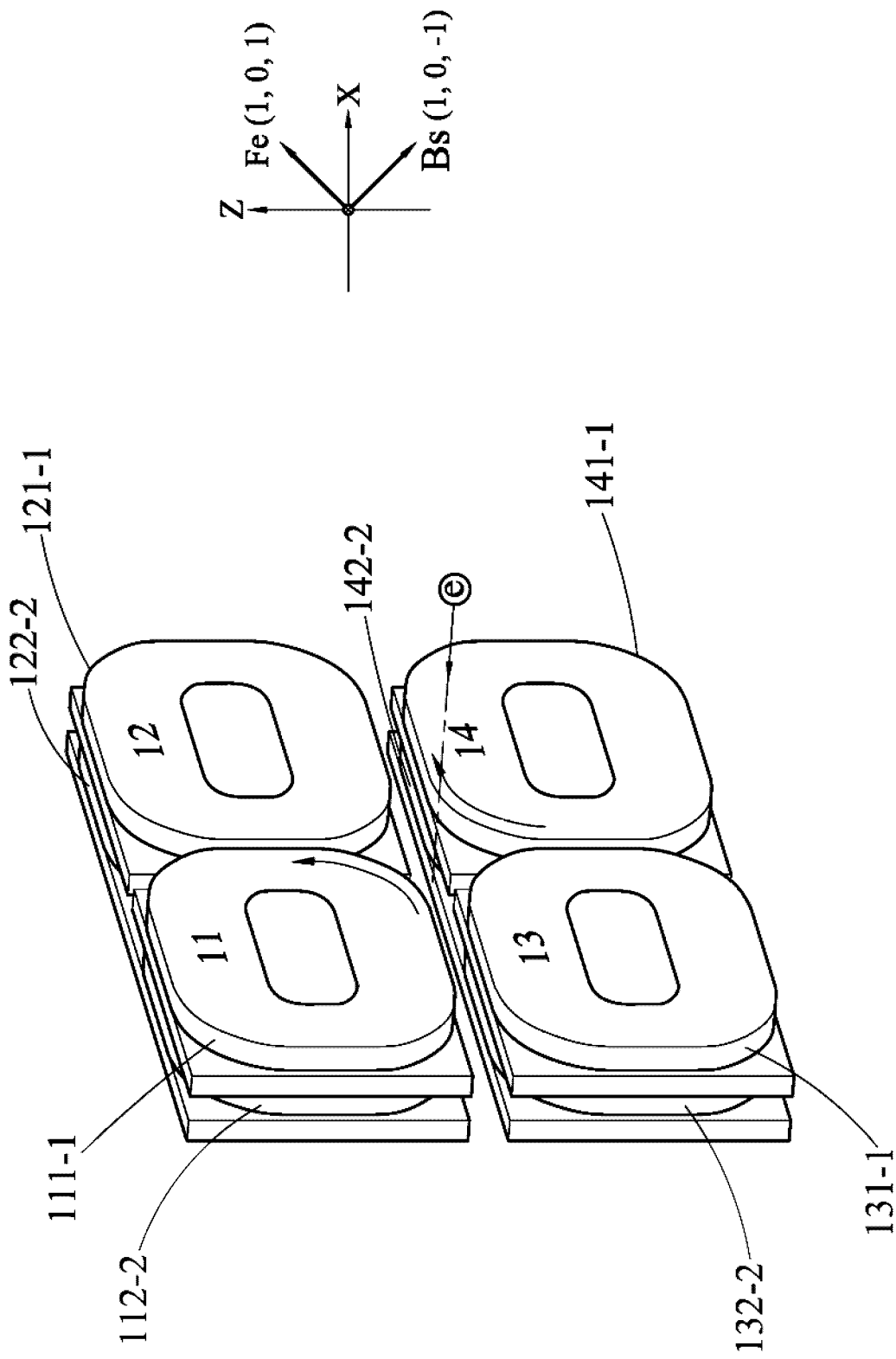
FIG. 3a is a first schematic diagram of 45° inclined linear polarization.

Referring to FIG. 3a, the undulator 1 is set as the above so that the first odd-numbered sequence coil 111-1 and the fourth odd-numbered sequence coil 141-1 generate current directions indicated by arrows. Similarly, a current direction of a first even-numbered sequence coil 112-2 is consistent with that of the first odd-numbered sequence coil 111-1, and a current direction of a fourth even-numbered sequence coil 142-2 is also consistent with that of the fourth odd-numbered sequence coil 141-1.

In this case, a direction of a vector sum Bs of a magnetic field established by the first coils (111-1 and 141-1) of the first magnetic pole array 11 and the fourth magnetic pole array 14 is (1, 0, −1). Bs may be decomposed into Bx and Bz. Bx and Bz have same magnitudes and a difference between phases is π. When the electron beam e reaches first coils of the magnetic pole arrays along the electron beam passage 90, $F_e$=−(0, 1, 0)×(1, 0, −1)=(1, 0, 1). To be specific, the electron beam e is polarized along a direction of (1, 0, 1).

Similarly, a direction of a vector sum Bs of a magnetic field established by second coils (112-2 and 142-2) of the first magnetic pole array 11 and the fourth magnetic pole array 14 is also (1, 0, −1). Therefore, the electron beam e is still polarized along the direction of (1, 0, 1) when the electron beam e travels through the second coils of the first magnetic pole array 11 and the fourth magnetic pole array 14.

Figure 3B:
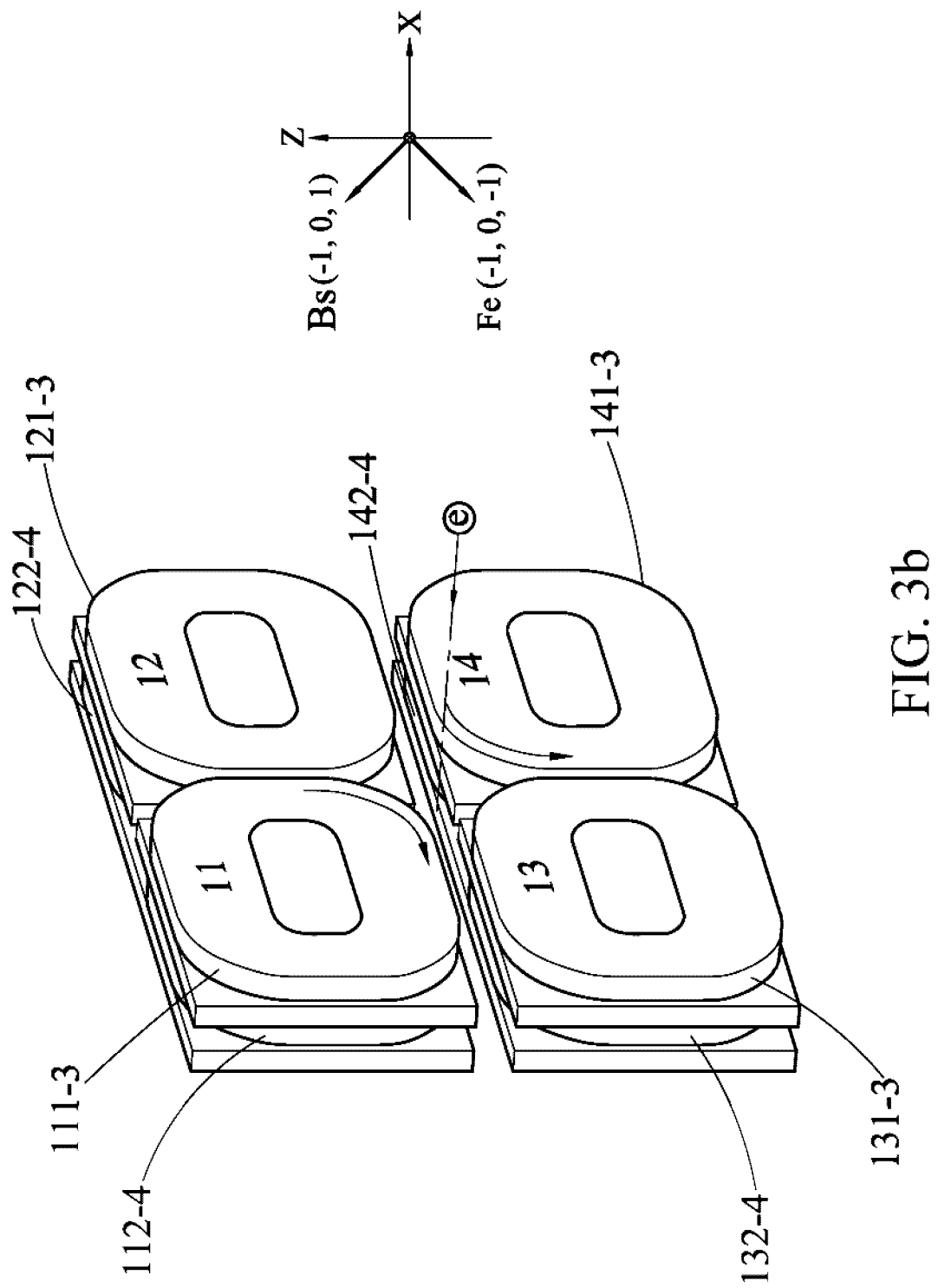
FIG. 3b is a second schematic diagram of 45° inclined linear polarization.

Further referring to FIG. 3b, the undulator 1 is set as the above so that a first odd-numbered sequence coil 111-3 and a fourth odd-numbered sequence coil 141-3 generate current directions indicated by arrows. Similarly, a current direction of a first even-numbered sequence coil 112-4 is consistent with that of the first odd-numbered sequence coil 111-3, and a current direction of a fourth even-numbered sequence coil 142-4 is also consistent with that of the fourth odd-numbered sequence coil 141-3.

A direction of a vector sum Bs of a magnetic field established by the third coils (111-3 and 141-3) of the first magnetic pole array 11 and the four magnetic pole array 14 is (−1, 0, 1). Once the electron beam e passes through second coils of the magnetic pole arrays, the electron beam e is not subject to a magnetic field in (1, 0, −1) any longer but subject to a magnetic field in the direction of (−1, 0, 1). In this case, $F_{e=−[}(0, 1, 0)×(−1, 0, 1)=(−1, 0, −1)$. Therefore, the electron beam e is polarized along the direction of (−1, 0, −1) when the electron beam e travels through the third coils of the first magnetic pole array 11 and the fourth magnetic pole array 14.

Similarly, a direction of a vector sum Bs of a magnetic field established by the fourth coils (112-4 and 142-4) of the first magnetic pole array 11 and the fourth magnetic pole array 14 is also (−1, 0, 1). Therefore, the electron beam e is still polarized along the direction of (−1, 0, −1) when the electron beam e travels through the fourth coils of the first magnetic pole array 11 and the fourth magnetic pole array 14.

To this point, the electron beam e has passed through one periodical length of the undulator 1. Subsequently, each time the electron beam e passes through the four coils of the magnetic pole arrays, the electron beam e repeatedly goes through the foregoing polarization process. When the electron beam e completely passes through the undulator 1, the electron beam e is polarized for six times in total. When facing the electron beam e, an observer may observe a traveling track of the electron beam e as shown in FIG. 3c and 45° inclined linear polarization is presented.

Horizontal linear polarization: When a traveling direction of the electron beam e is defined as the Y-axis direction, a condition of the horizontal linear polarization is Bx=0, and only a magnetic field Bz in the Y-axis direction is reserved. To make the electron beam e meet the foregoing condition after passing through the undulator 1, the undulator 1 may be set as follows:

(1) the first magnetic pole array 11: the first odd-numbered sequence coils 111 are energized with a forward current; and the first even-numbered sequence coils 112 are energized with the forward current;

(2) the second magnetic pole array 12: the second odd-numbered sequence coils 121 are energized with the forward current; and the second even-numbered sequence coils 122 are energized with the forward current;

(3) the third magnetic pole array 13: the third odd-numbered sequence coils 131 are energized with a reverse current; and the third even-numbered sequence coils 132 are energized with the reverse current; and (4) the fourth magnetic pole array 14: the fourth odd-numbered sequence coils 141 are energized with the reverse current; and the fourth even-numbered sequence coils 142 are energized with the reverse current.

Figure 4A:
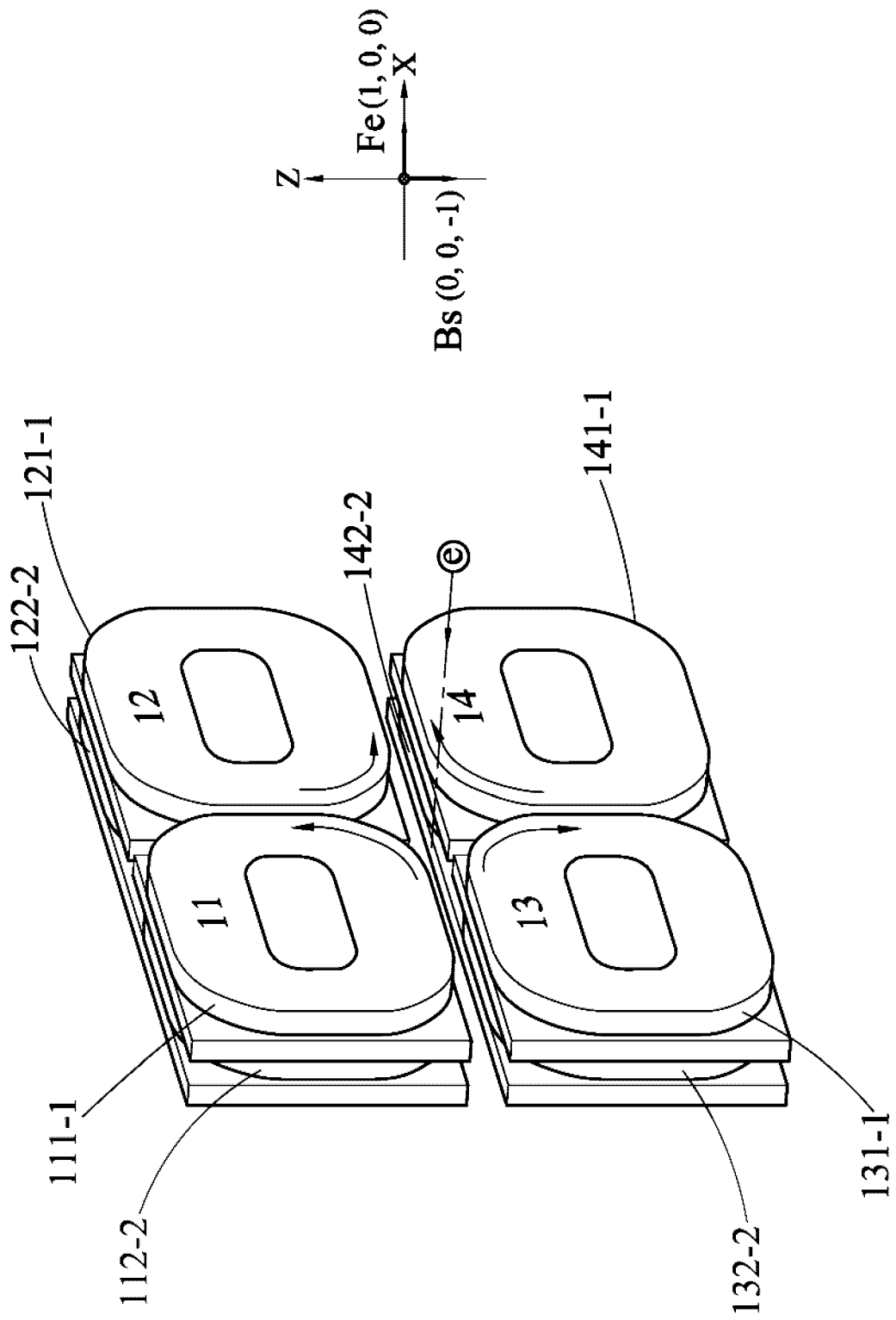
FIG. 4a is a first schematic diagram of horizontal linear polarization.

Referring to FIG. 4a, the undulator 1 is set as the above so that the first odd-numbered sequence coil 111-1, the second odd-numbered sequence coil 121-1, the third odd-numbered sequence coil 131-1, and the fourth odd-numbered sequence coil 141-1 generate current directions indicated by arrows. Similarly, a current direction of a first even-numbered sequence coil 112-2 is consistent with that of the first odd-numbered sequence coil 111-1, a current direction of a second even-numbered sequence coil 122-2 is consistent with that of the second odd-numbered sequence coil 121-1, a current direction of a third even-numbered sequence coil 132-2 is consistent with that of the third odd-numbered sequence coil 131-1, and a current direction of a fourth even-numbered sequence coil 142-2 is also consistent with that of the fourth odd-numbered sequence coil 141-1.

In this case, a direction of a vector sum of a magnetic field established by the first coils (111-1 and 141-1) of the first magnetic pole array 11 and the fourth magnetic pole array 14 is (1, 0, −1). A direction of a vector sum of a magnetic field established by the first coils (121-1 and 131-1) of the second magnetic pole array 12 and the third magnetic pole array 13 is (−1, 0, −1). Therefore, a direction of a vector sum Bs of a magnetic field established by the first coils of the magnetic pole arrays is (0, 0, −1). To be specific, Bs has only a component Bz in the Z-axis direction. When the electron beam e reaches the first coils of the magnetic pole arrays along the electron beam passage 90, $F_e=-[(0, 1, 0)\times(0, 0, -1)]=(1, 0, 0)$. Therefore, the electron beam e is polarized along a direction of (1, 0, 0).

Similarly, a direction of a vector sum Bs of a magnetic field established by the second coils of the magnetic pole arrays is also (0, 0, −1). Therefore, the electron beam e is still polarized along the direction of (1, 0, 0) when the electron beam e travels through the second coils of the magnetic pole arrays.

Figure 4B:
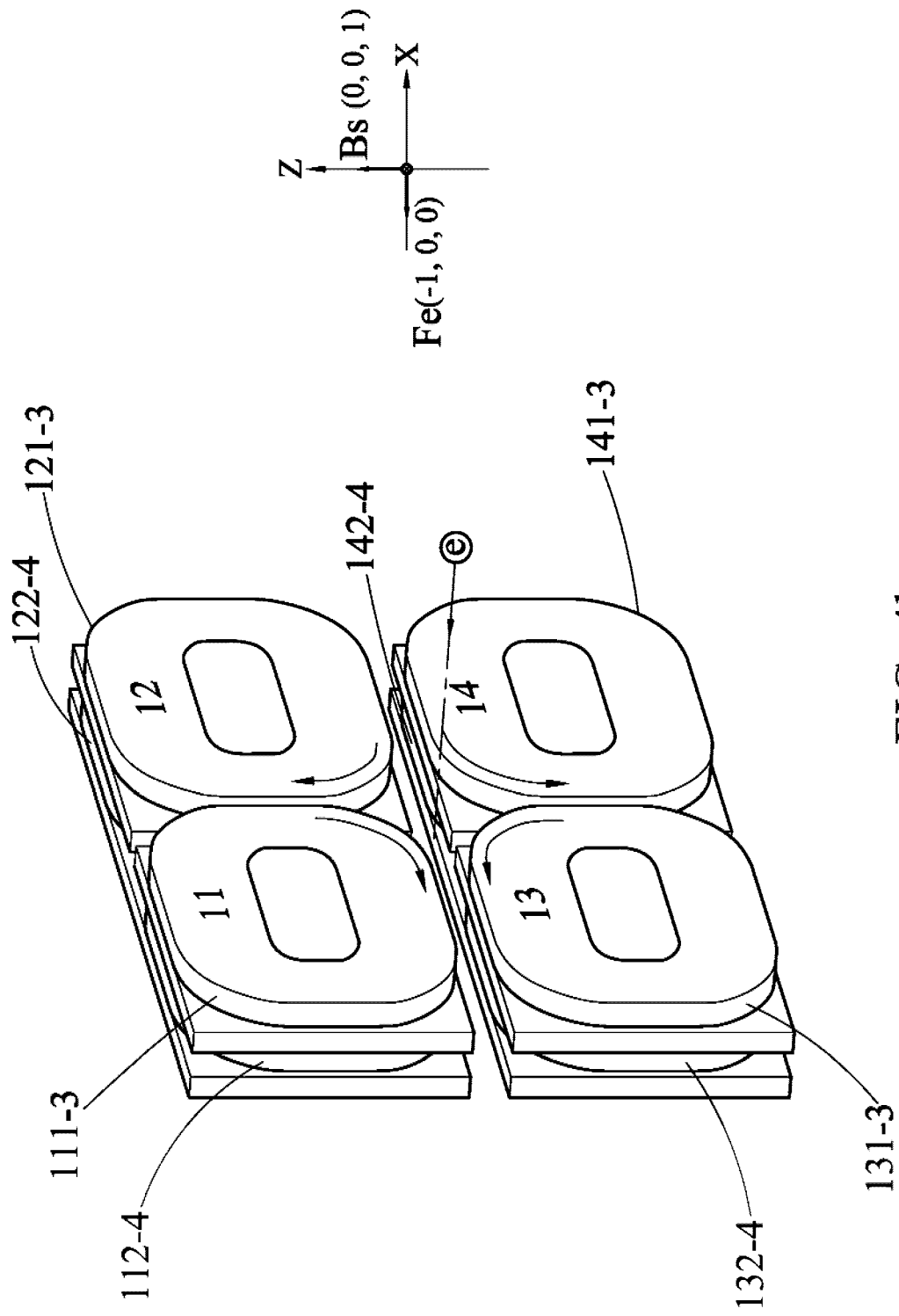
FIG. 4b is a second schematic diagram of horizontal linear polarization.

Further referring to FIG. 4b, the undulator 1 is set as the above so that a first odd-numbered sequence coil 111-3, a second odd-numbered sequence coil 121-3, a third odd-numbered sequence coil 131-3, and a fourth odd-numbered sequence coil 141-3 generate current directions indicated by arrows. Similarly, a current direction of a first even-numbered sequence coil 112-4 is consistent with that of the first odd-numbered sequence coil 111-3, a current direction of a second even-numbered sequence coil 122-4 is consistent with that of the second odd-numbered sequence coil 121-3, a current direction of a third even-numbered sequence coil 132-4 is consistent with that of the third odd-numbered sequence coil 131-3, and a current direction of a fourth even-numbered sequence coil 142-4 is also consistent with that of the fourth odd-numbered sequence coil 141-3.

In this case, a direction of a vector sum of a magnetic field established by the third coils (111-3 and 141-3) of the first magnetic pole array 11 and the fourth magnetic pole array 14 is (−1, 0, 1). A direction of a vector sum of a magnetic field established by the third coils (121-3 and 131-3) of the second magnetic pole array 12 and the third magnetic pole array 13 is (1, 0, 1). Therefore, a direction of a vector sum Bs of a magnetic field established by the third coils of the magnetic pole arrays is (0, 0, 1). To be specific, Bs has only the component Bz in the Z-axis direction. When the electron beam e reaches the first coils of the magnetic pole arrays along the electron beam passage 90, $F_e=-[(0, 1, 0)\times(0, 0, 1)]=(-1, 0, 0)$. The electron beam e is polarized along a direction of (−1, 0, 0).

Similarly, a direction of a vector sum Bs of a magnetic field established by fourth coils of the magnetic pole arrays is also (0, 0, 1). Therefore, the electron beam e is still polarized along the direction of (−1, 0, 0) when the electron beam e travels through the fourth coils of the magnetic pole arrays.

Figure 4C:
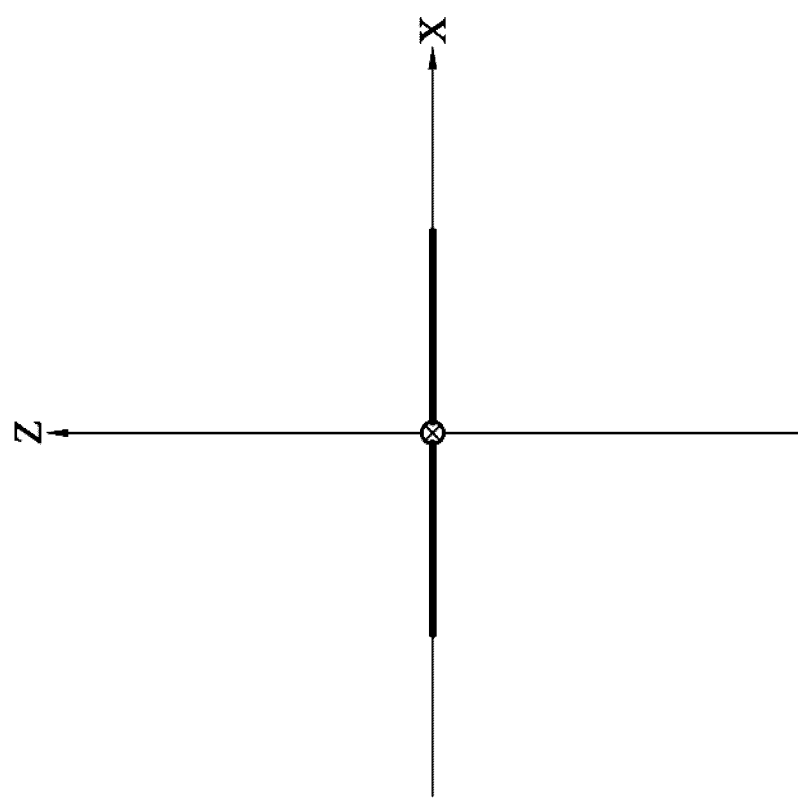
FIG. 4c is a schematic diagram of a track of an end of a magnetic field vector of horizontal linear polarization.

To this point, the electron beam e has passed through one periodical length of the undulator 1. Subsequently, each time the electron beam e passes through the four coils of the magnetic pole arrays, the electron beam e repeatedly goes through the foregoing polarization process. When the electron beam e completely passes through the undulator 1, the electron beam e is polarized for six times in total. When facing the electron beam e, an observer may observe a traveling track of the electron beam e as shown in FIG. 4c and horizontal linear polarization is presented.

Vertical linear polarization: When a traveling direction of the electron beam e is defined as the Y-axis direction, a condition of the horizontal linear polarization is Bz=0, and only a magnetic field Bx in the X-axis direction is reserved. To make the electron beam e meet the foregoing condition after passing through the undulator 1, the undulator 1 may be set as follows:

(1) the first magnetic pole array 11: the first odd-numbered sequence coils 111 are energized with a forward current; and the first even-numbered sequence coils 112 are energized with the forward current;

(2) the second magnetic pole array 12: the second odd-numbered sequence coils 121 are energized with a reverse current; and the second even-numbered sequence coils 122 are energized with the reverse current;

(3) the third magnetic pole array 13: the third odd-numbered sequence coils 131 are energized with the forward current; and the third even-numbered sequence coils 132 are energized with the forward current; and (4) the fourth magnetic pole array 14: the fourth odd-numbered sequence coils 141 are energized with the reverse current; and the fourth even-numbered sequence coils 142 are energized with the reverse current.

Figure 5A:
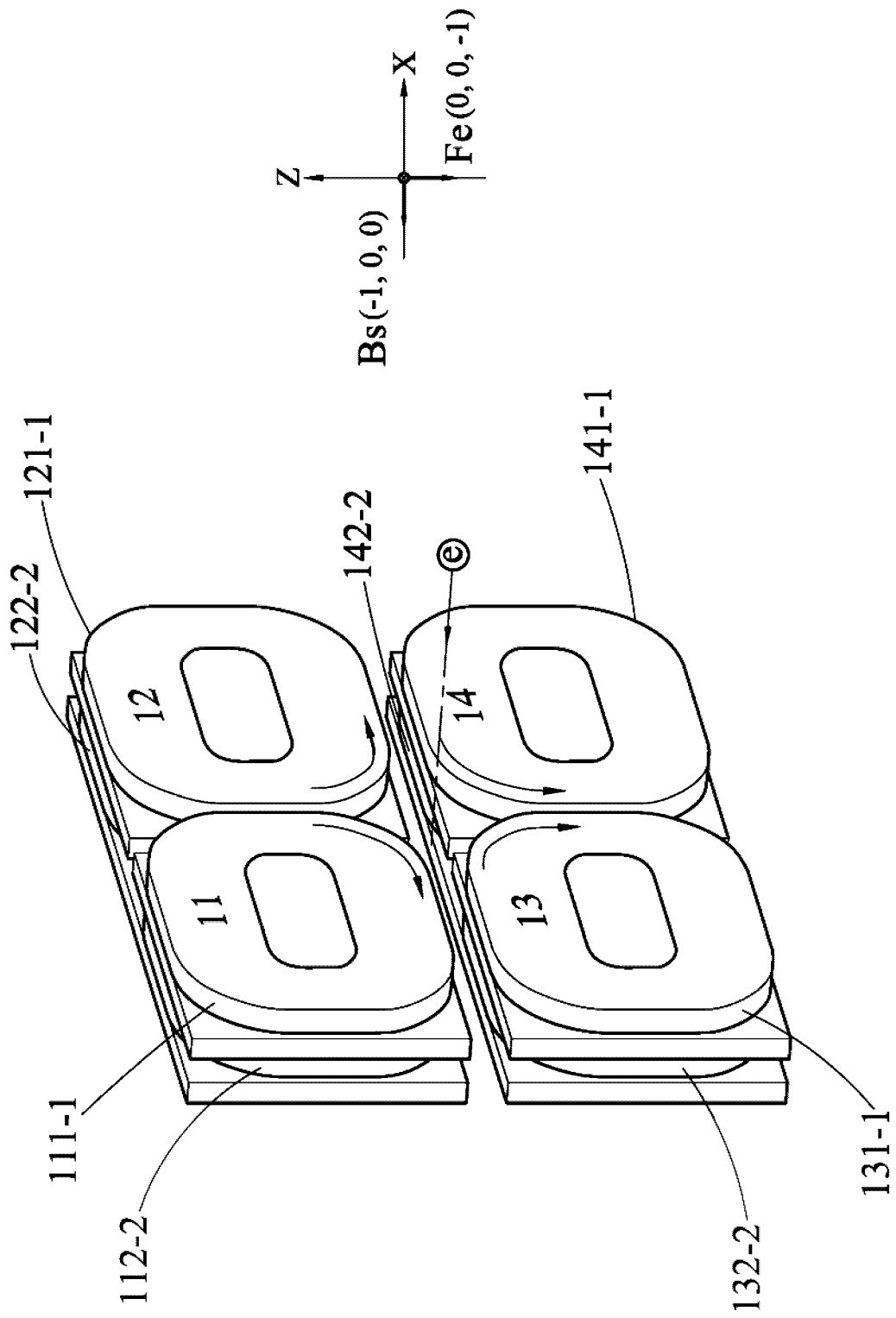
FIG. 5a is a first schematic diagram of vertical linear polarization.

Referring to FIG. 5a, the undulator 1 is set as the above so that the first odd-numbered sequence coil 111-1, the second odd-numbered sequence coil 121-1, the third odd-numbered sequence coil 131-1, and the fourth odd-numbered sequence coil 141-1 generate current directions indicated by arrows. Similarly, a current direction of a first even-numbered sequence coil 112-2 is consistent with that of the first odd-numbered sequence coil 111-1, a current direction of a second even-numbered sequence coil 122-2 is consistent with that of the second odd-numbered sequence coil 121-1, a current direction of a third even-numbered sequence coil 132-2 is consistent with that of the third odd-numbered sequence coil 131-1, and a current direction of a fourth even-numbered sequence coil 142-2 is also consistent with that of the fourth odd-numbered sequence coil 141-1.

In this case, a direction of a vector sum of a magnetic field established by the first coils (111-1 and 141-1) of the first magnetic pole array 11 and the fourth magnetic pole array 14 is (−1, 0, 1). A direction of a vector sum of a magnetic field established by the first coils (121-1 and 131-1) of the second magnetic pole array 12 and the third magnetic pole array 13 is (−1, 0, −1). Therefore, a direction of a vector sum Bs of a magnetic field established by the first coils of the magnetic pole arrays is (−1, 0, 0). To be specific, Bs has only a component Bx in the X-axis direction. When the electron beam e reaches the first coils of the magnetic pole arrays along the electron beam passage 90, $F_e$=−[(0, 1, 0)×(−1, 0, 0)]=(0, 0, −1). Therefore, the electron beam e is polarized along a direction of (0, 0, −1).

Similarly, a direction of a vector sum Bs of a magnetic field established by the second coils of the magnetic pole arrays is also (−1, 0, 0). Therefore, the electron beam e is still polarized along the direction of (0, 0, −1) when the electron beam e travels through the second coils of the magnetic pole arrays.

Figure 5B:
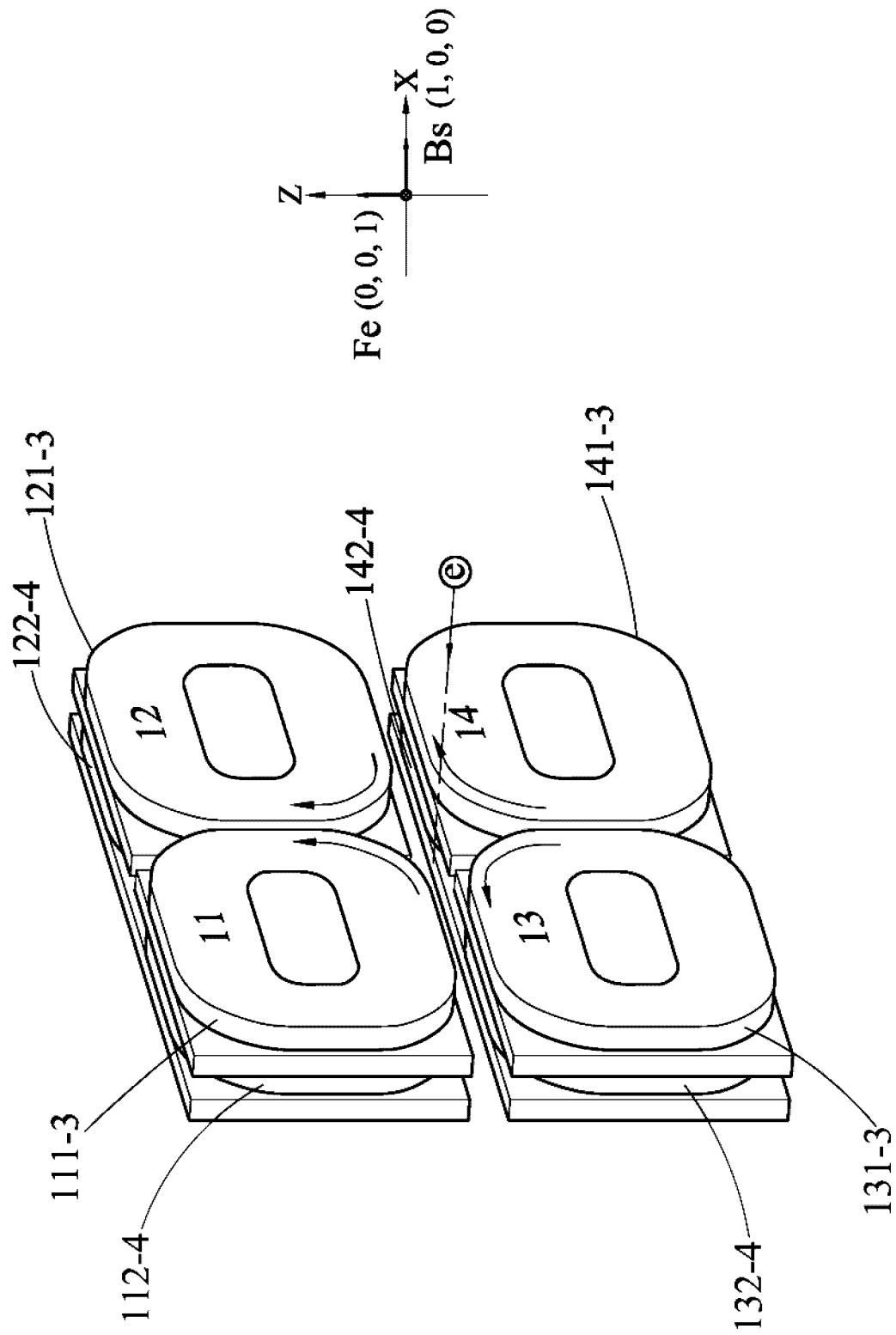
FIG. 5b is a second schematic diagram of vertical linear polarization.

Further referring to FIG. 5b, the undulator 1 is set as the above so that a first odd-numbered sequence coil 111-3, a second odd-numbered sequence coil 121-3, a third odd-numbered sequence coil 131-3, and a fourth odd-numbered sequence coil 141-3 generate current directions indicated by arrows. Similarly, a current direction of a first even-numbered sequence coil 112-4 is consistent with that of the first odd-numbered sequence coil 111-3, a current direction of a second even-numbered sequence coil 122-4 is consistent with that of the second odd-numbered sequence coil 121-3, a current direction of a third even-numbered sequence coil 132-4 is consistent with that of the third odd-numbered sequence coil 131-3, and a current direction of a fourth even-numbered sequence coil 142-4 is also consistent with that of the fourth odd-numbered sequence coil 141-3.

In this case, a direction of a vector sum of a magnetic field established by the third coils (111-3 and 141-3) of the first magnetic pole array 11 and the fourth magnetic pole array 14 is (1, 0, −1). A direction of a vector sum of a magnetic field established by the third coils (121-3 and 131-3) of the second magnetic pole array 12 and the third magnetic pole array 13 is (1, 0, 1). Therefore, a direction of a vector sum Bs of a magnetic field established by the third coils of the magnetic pole arrays is (1, 0, 0). To be specific, Bs has only the component Bx in the X-axis direction. When the electron beam e reaches the first coils of the magnetic pole arrays along the electron beam passage 90, $F_e$=−[(0, 0, 1, 0)×(1, 0, 0)]=(0, 0, 1). The electron beam e is polarized along a direction of (0, 0, 1).

Similarly, a direction of a vector sum Bs of a magnetic field established by fourth coils of the magnetic pole arrays is also (1, 0, 0). Therefore, the electron beam e is still polarized along the direction of (0, 0, 1) when the electron beam e travels through the fourth coils of the magnetic pole arrays.

To this point, the electron beam e has passed through one periodical length of the undulator 1. Subsequently, each time the electron beam e passes through the four coils of the magnetic pole arrays, the electron beam e repeatedly goes through the foregoing polarization process. When the electron beam e completely passes through the undulator 1, the electron beam e is polarized for six times in total. When facing the electron beam e, an observer may observe a traveling track of the electron beam e as shown in FIG. 5c and vertical linear polarization is presented.

Left-hand circular polarization/left-hand elliptical polarization: When a traveling direction of the electron beam e is defined as the Y-axis direction, a condition of the left-hand circular polarization is $B_X=B_Z$, and a phase difference $\Delta\phi$ between $B_X$ and $B_Z$ is $\pi/2$, namely, out-of-phase lead. A condition of the left-hand elliptical polarization is $B_X \neq B_Z$, and a phase difference $\Delta\phi$ between $B_X$ and $B_Z$ is $\pi/2$, namely, out-of-phase lead. A principle of the left-hand elliptical polarization is similar to that of the left-hand circular polarization. A difference is only that magnitudes of $B_X$ and $B_Z$ are different. Therefore, the following describes only the left-hand circular polarization. To make the electron beam e meet the condition of the left-hand circular polarization after passing through the undulator 1, the undulator 1 may be set as follows:

(1) the first magnetic pole array 11: the first odd-numbered sequence coils 111 are energized with a forward current; and the first even-numbered sequence coils 112 are energized with the forward current;

(2) the second magnetic pole array 12: the second odd-numbered sequence coils 121 are energized with a reverse current; and the second even-numbered sequence coils 122 are energized with the forward current;

(3) the third magnetic pole array 13: the third odd-numbered sequence coils 131 are energized with the forward current; and the third even-numbered sequence coils 132 are energized with the reverse current; and (4) the fourth magnetic pole array 14: the fourth odd-numbered sequence coils 141 are energized with the reverse current; and the fourth even-numbered sequence coils 142 are energized with the reverse current.

Figure 6A:
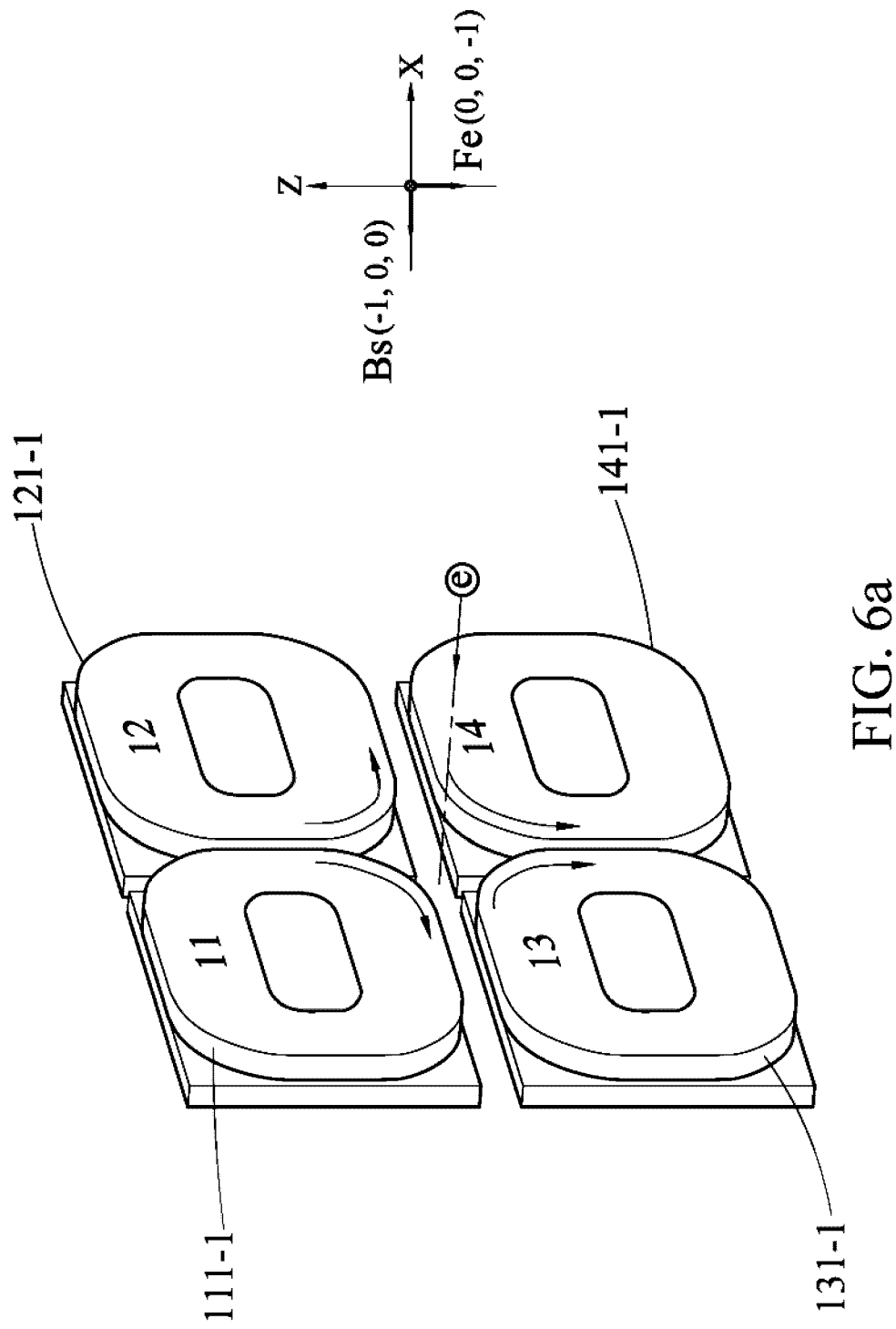
FIG. 6a is a first schematic diagram of left-hand circular polarization.

Referring to FIG. 6a, the undulator 1 is set as the above so that the first odd-numbered sequence coil 111-1, the second odd-numbered sequence coil 121-1, the third odd-numbered sequence coil 131-1, and the fourth odd-numbered sequence coil 141-1 generate current directions indicated by arrows. In this case, a direction of a vector sum of a magnetic field established by the first coils (111-1, 121-1, 131-1, and 141-1) of the magnetic pole arrays is (−1, 0, 0).

When the electron beam e reaches the first coils of the magnetic pole arrays along the electron beam passage 90, $F_e=-[(0, 1, 0)\times(-1, 0, 0)=(0, 0, -1)$. Therefore, the electron beam e is polarized along a direction of (0, 0, -1).

Figure 6B:
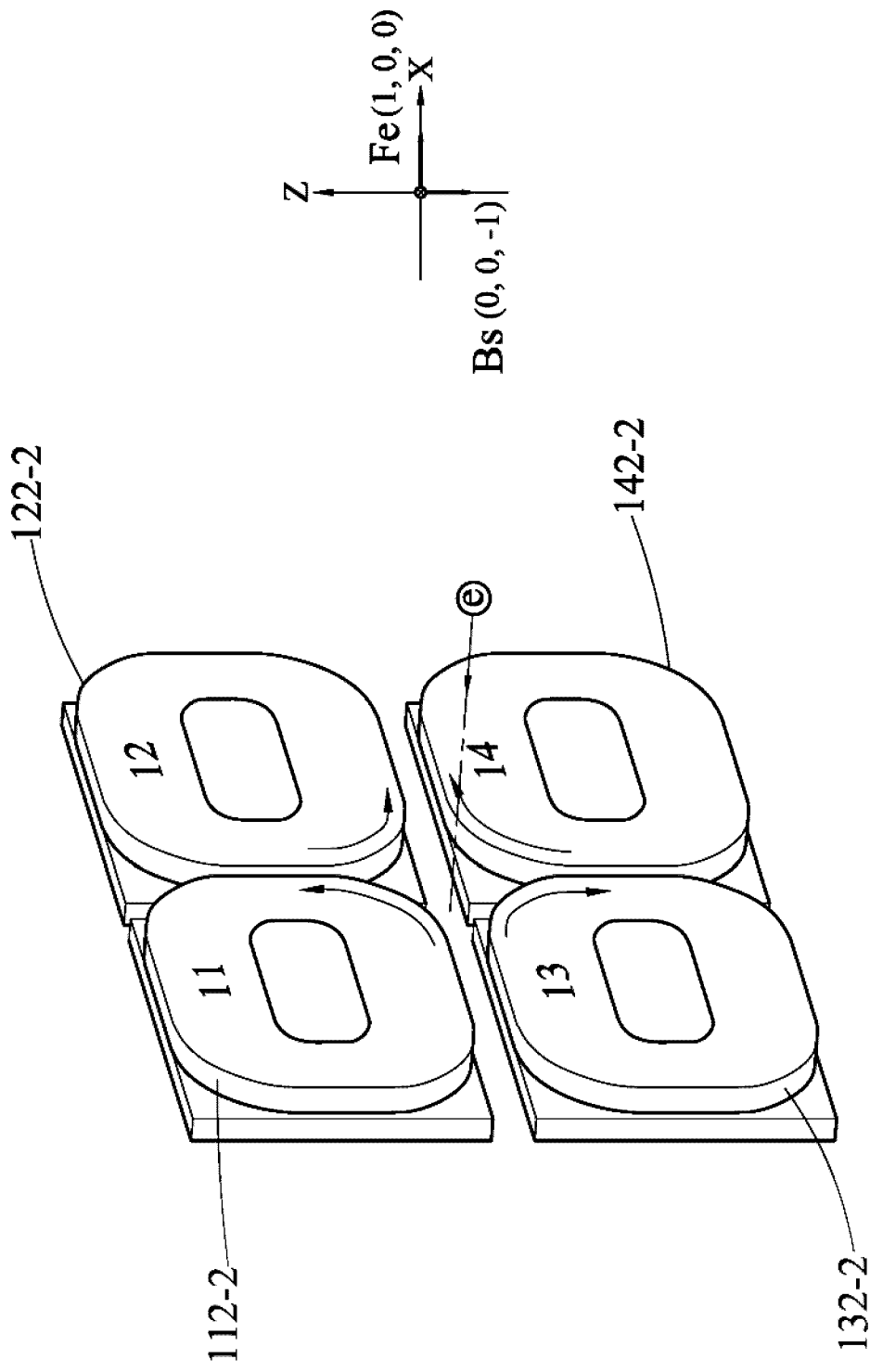
FIG. 6b is a second schematic diagram of left-hand circular polarization.

Referring to FIG. 6b, the undulator 1 is set as the above so that a first even-numbered sequence coil 112-2, a second even-numbered sequence coil 122-2, a third even-numbered sequence coil 132-2, and a fourth even-numbered sequence coil 142-2 generate current directions indicated by arrows. In this case, a direction of a vector sum of a magnetic field established by the second coils (112-2, 122-2, 132-2, and 142-2) of the magnetic pole arrays is (0, 0, -1). When the electron beam e reaches the second coils of the magnetic pole arrays along the electron beam passage 90, $F_e=-[(0, 1, 0)\times(0, 0, -1)=(0, 0, -1)$. Therefore, the electron beam e is polarized along a direction of (1, 0, 0).

Figure 6C:
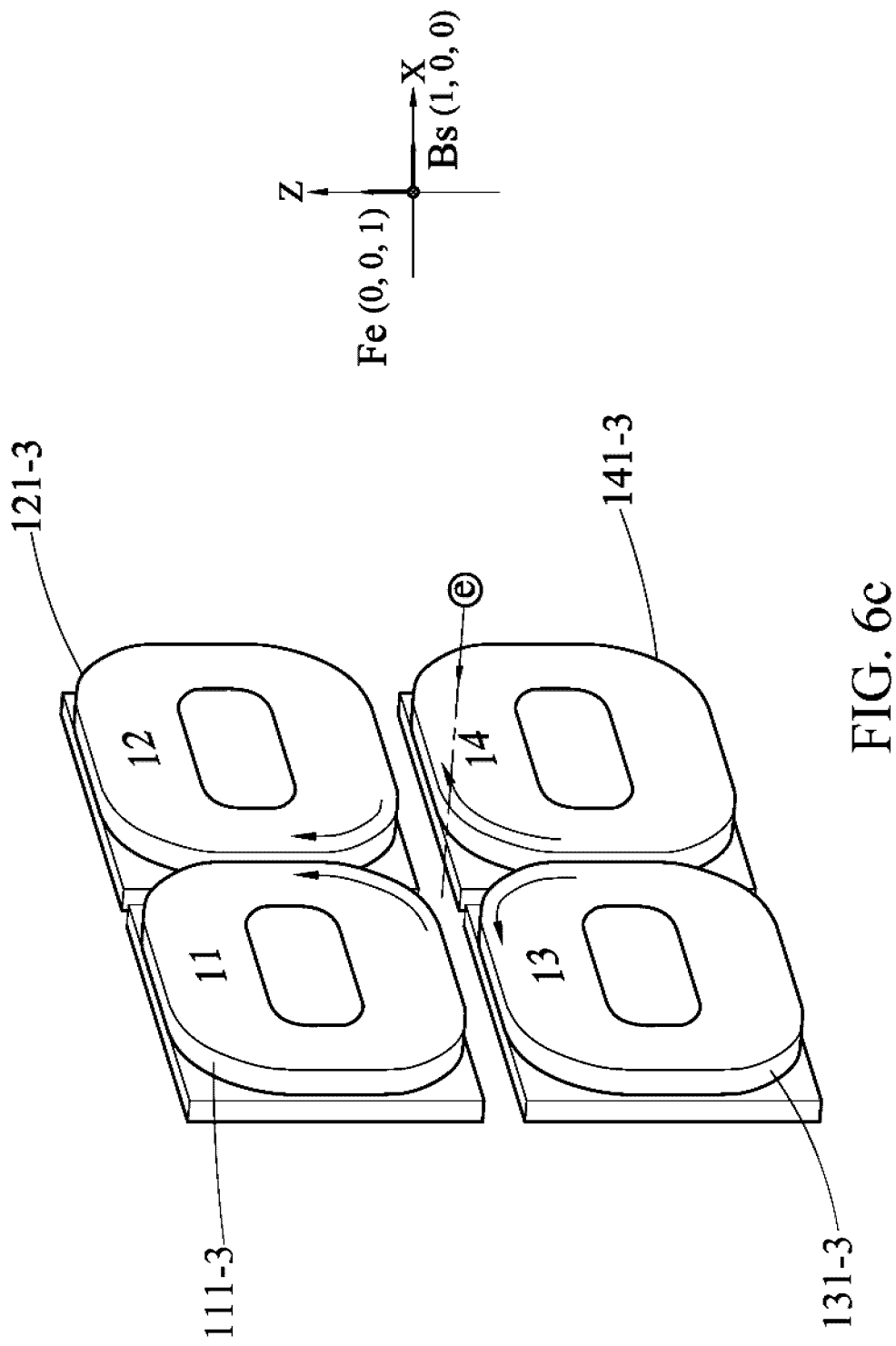
FIG. 6c is a third schematic diagram of left-hand circular polarization.

Referring to FIG. 6c, the undulator 1 is set as the above so that a first odd-numbered sequence coil 111-3, a second odd-numbered sequence coil 121-3, a third odd-numbered sequence coil 131-3, and a fourth odd-numbered sequence coil 141-3 generate current directions indicated by arrows. In this case, a direction of a vector sum of a magnetic field established by the third coils (111-3, 121-3, 131-3, and 141-3) of the magnetic pole arrays is (1, 0, 0). When the electron beam e reaches the first coils of the magnetic pole arrays along the electron beam passage 90, $F_e=-[(0, 1, 0)\times(1, 0, 0)=(0, 0, 1)$. Therefore, the electron beam e is polarized along a direction of (0, 0, 1).

Figure 6D:
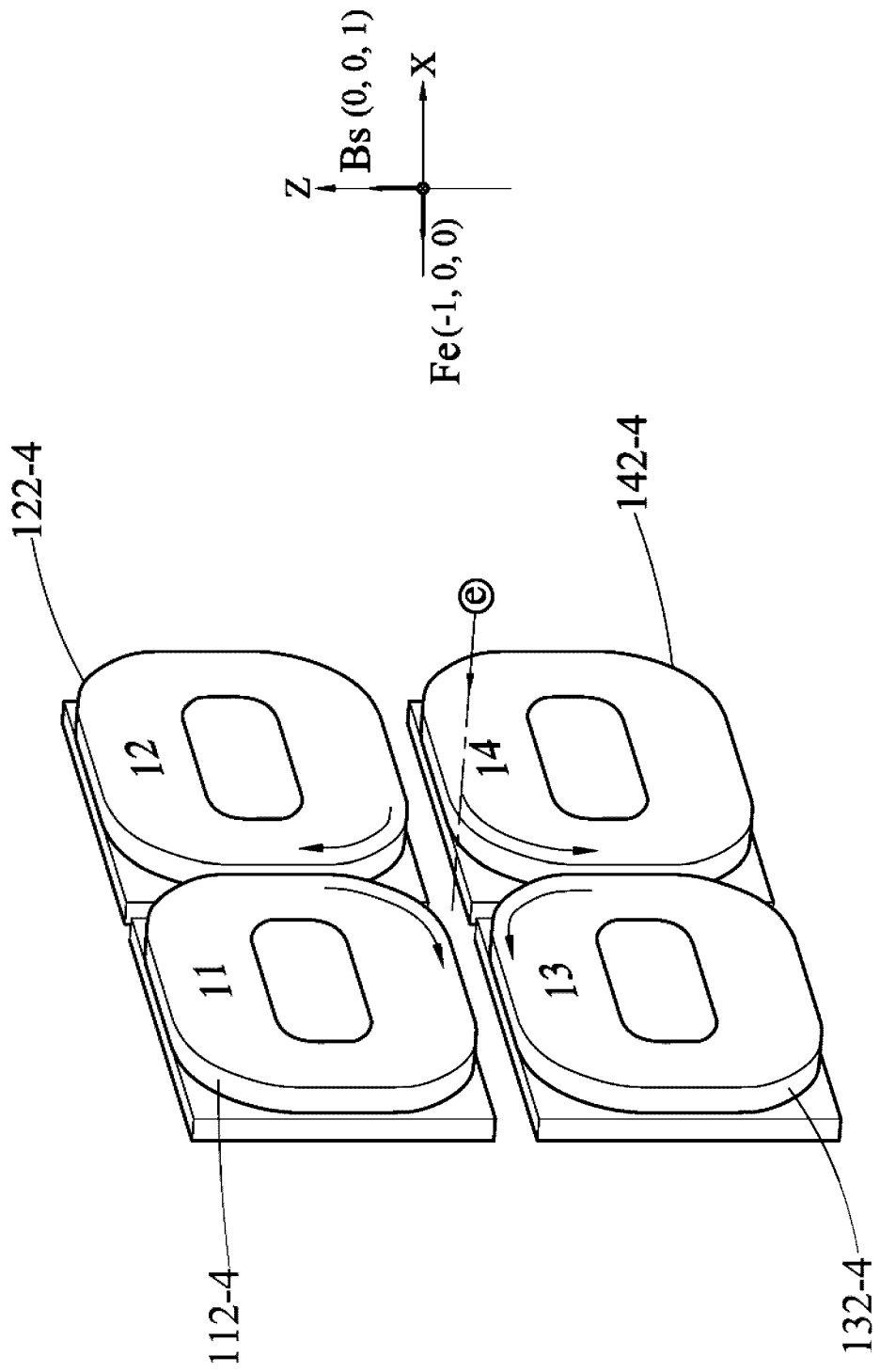
FIG. 6d is a fourth schematic diagram of left-hand circular polarization.

Referring to FIG. 6d, the undulator 1 is set as the above so that a first even-numbered sequence coil 112-4, a second even-numbered sequence coil 122-4, a third even-numbered sequence coil 132-4, and a fourth even-numbered sequence coil 142-4 generate current directions indicated by arrows. In this case, a direction of a vector sum of a magnetic field established by the second coils (112-4, 122-4, 132-4, and 142-4) of the magnetic pole arrays is (0, 0, 1). When the electron beam e reaches the second coils of the magnetic pole arrays along the electron beam passage 90, $F_e=-[(0, 1, 0)\times(0, 0, 1)=(-1, 0, 0)$. Therefore, the electron beam e is polarized along a direction of (-1, 0, 0).

To this point, the electron beam e has passed through one periodical length of the undulator 1. Subsequently, each time the electron beam e passes through the four coils of the magnetic pole arrays, the electron beam e repeatedly goes through the foregoing polarization process. When the electron beam e completely passes through the undulator 1, the electron beam e is polarized for six times in total. When facing the electron beam e, an observer may observe a traveling track of the electron beam e as shown in FIG. 6e and left-hand circular polarization is presented.

Right-hand circular polarization/right-hand elliptical polarization: When a traveling direction of the electron beam e is defined as the Y-axis direction, a condition of the right-hand circular polarization is $B_X=B_Z$, and a phase difference $\Delta\phi$ between $B_X$ and $B_Z$ is $-\pi/2$, namely, out-of-phase delay. A condition of the right-hand elliptical polarization is $B_X \neq B_Z$, and a phase difference $\Delta\phi$ between $B_X$ and $B_Z$ is $-\pi/2$, namely, out-of-phase delay. A principle of the right-hand elliptical polarization is similar to that of the right-hand circular polarization. A difference is only that magnitudes of $B_X$ and $B_Z$ are different. Therefore, the following describes only the right-hand circular polarization. To make the electron beam e meet the condition of the right-hand circular polarization after passing through the undulator 1, the undulator 1 may be set as follows:

(1) the first magnetic pole array 11: the first odd-numbered sequence coils 111 are energized with a forward current; and the first even-numbered sequence coils 112 are energized with the forward current;

(2) the second magnetic pole array 12: the second odd-numbered sequence coils 121 are energized with the forward current; and the second even-numbered sequence coils 122 are energized with a reverse current;

(3) the third magnetic pole array 13: the third odd-numbered sequence coils 131 are energized with the reverse current; and the third even-numbered sequence coils 132 are energized with the forward current; and (4) the fourth magnetic pole array 14: the fourth odd-numbered sequence coils 141 are energized with the reverse current; and the fourth even-numbered sequence coils 142 are energized with the reverse current.

Figure 7A:
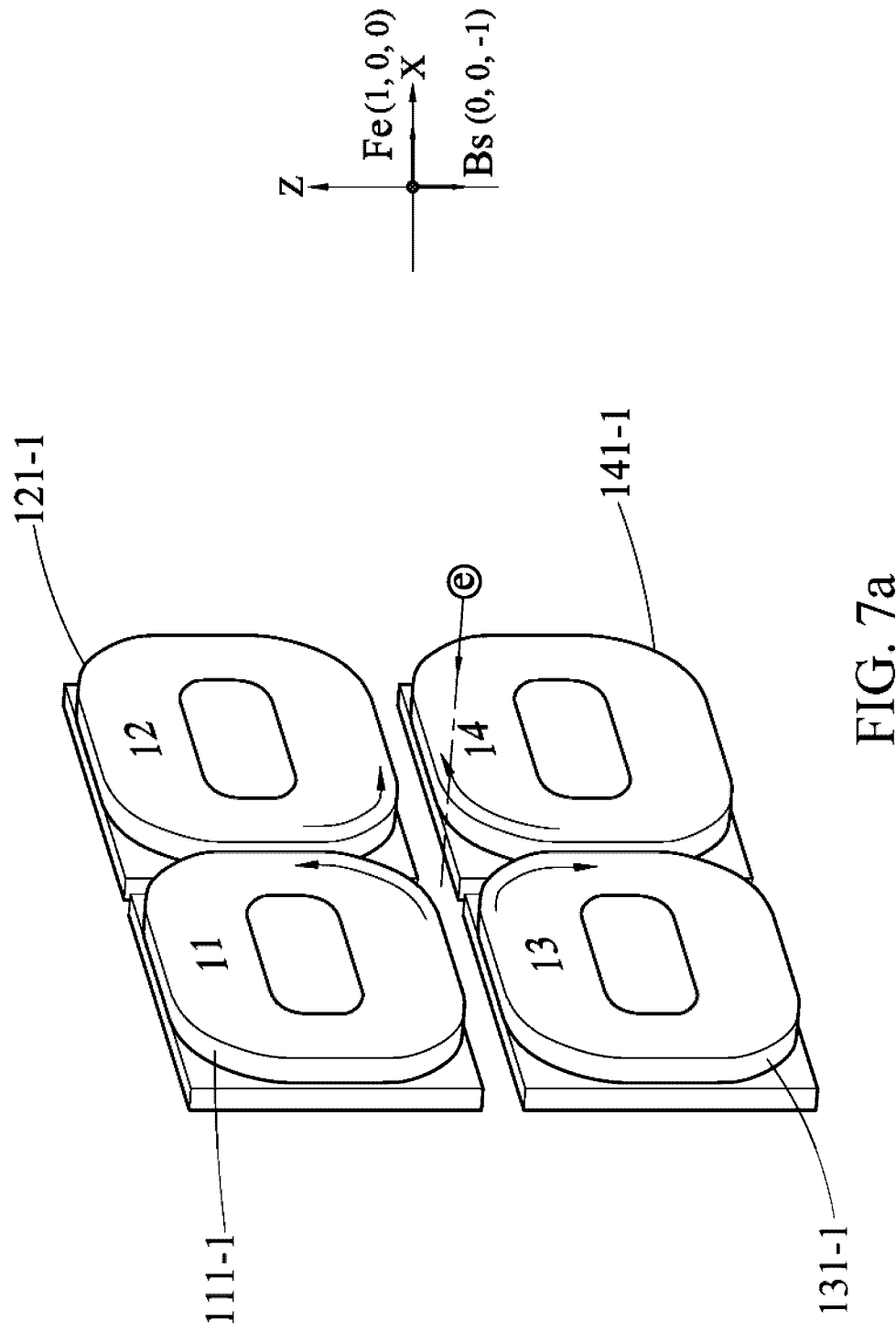
FIG. 7a is a first schematic diagram of right-hand circular polarization.

Referring to FIG. 7a, the undulator 1 is set as the above so that the first odd-numbered sequence coil 111-1, the second odd-numbered sequence coil 121-1, the third odd-numbered sequence coil 131-1, and the fourth odd-numbered sequence coil 141-1 generate current directions indicated by arrows. In this case, a direction of a vector sum of a magnetic field established by the first coils (111-1, 121-1, 131-1, and 141-1) of the magnetic pole arrays is (0, 0, -1). When the electron beam e reaches the first coils of the magnetic pole arrays along the electron beam passage 90, $F_e=-[(0, 1, 0)\times(0, 0, -1)=(1, 0, 0)$. Therefore, the electron beam e is polarized along a direction of (1, 0, 0).

Figure 7B:
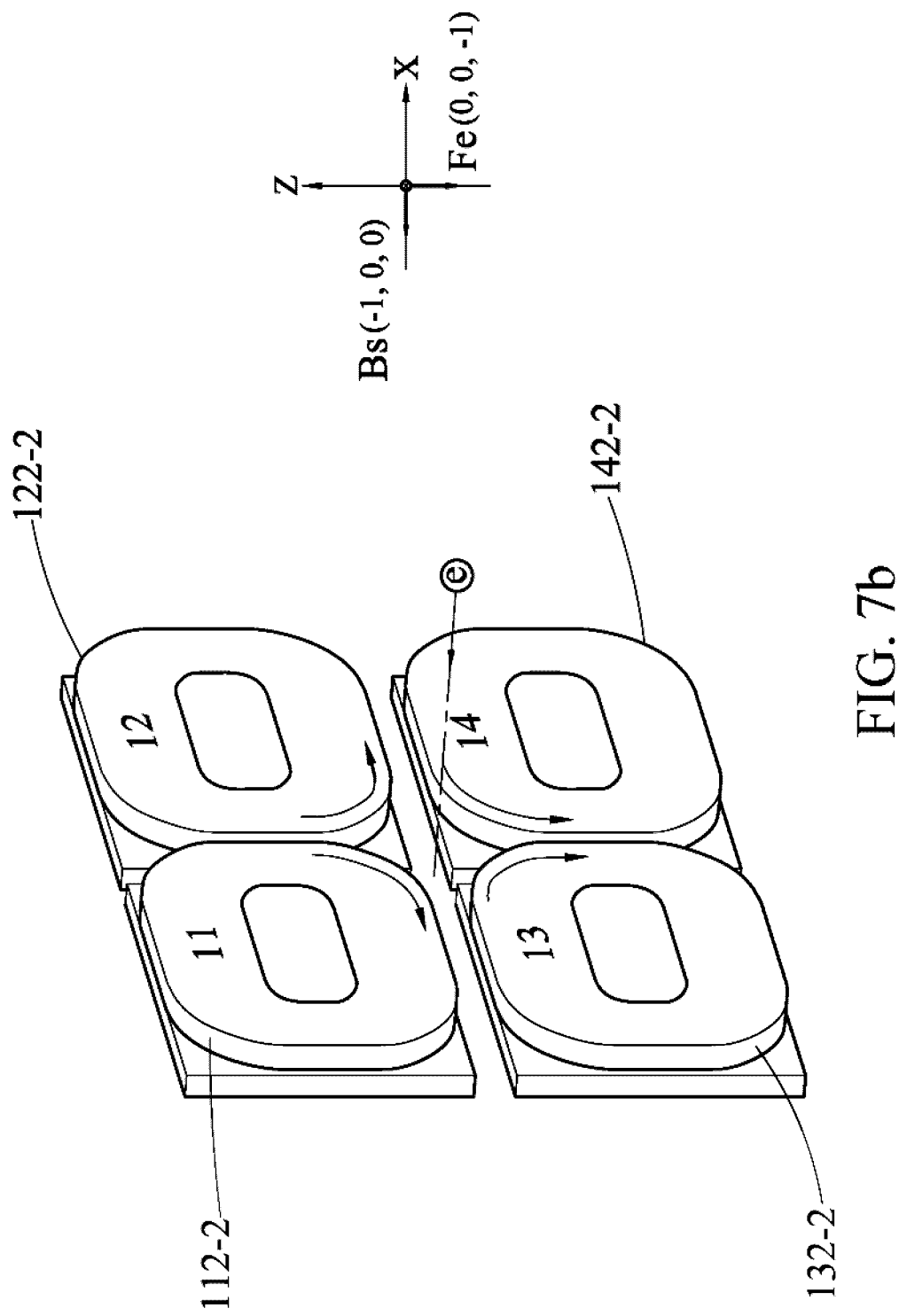
FIG. 7b is a second schematic diagram of right-hand circular polarization.

Referring to FIG. 7b, the undulator 1 is set as the above so that a first even-numbered sequence coil 112-2, a second even-numbered sequence coil 122-2, a third even-numbered sequence coil 132-2, and a fourth even-numbered sequence coil 142-2 generate current directions indicated by arrows. In this case, a direction of a vector sum of a magnetic field established by the second coils (112-2, 122-2, 132-2, and 142-2) of the magnetic pole arrays is (-1, 0, 0). When the electron beam e reaches the second coils of the magnetic pole arrays along the electron beam passage 90, $F_e=-[(0, 1, 0)\times(-1, 0, 0)=(0, 0, -1)$. Therefore, the electron beam e is polarized along a direction of (0, 0, -1).

Figure 7C:
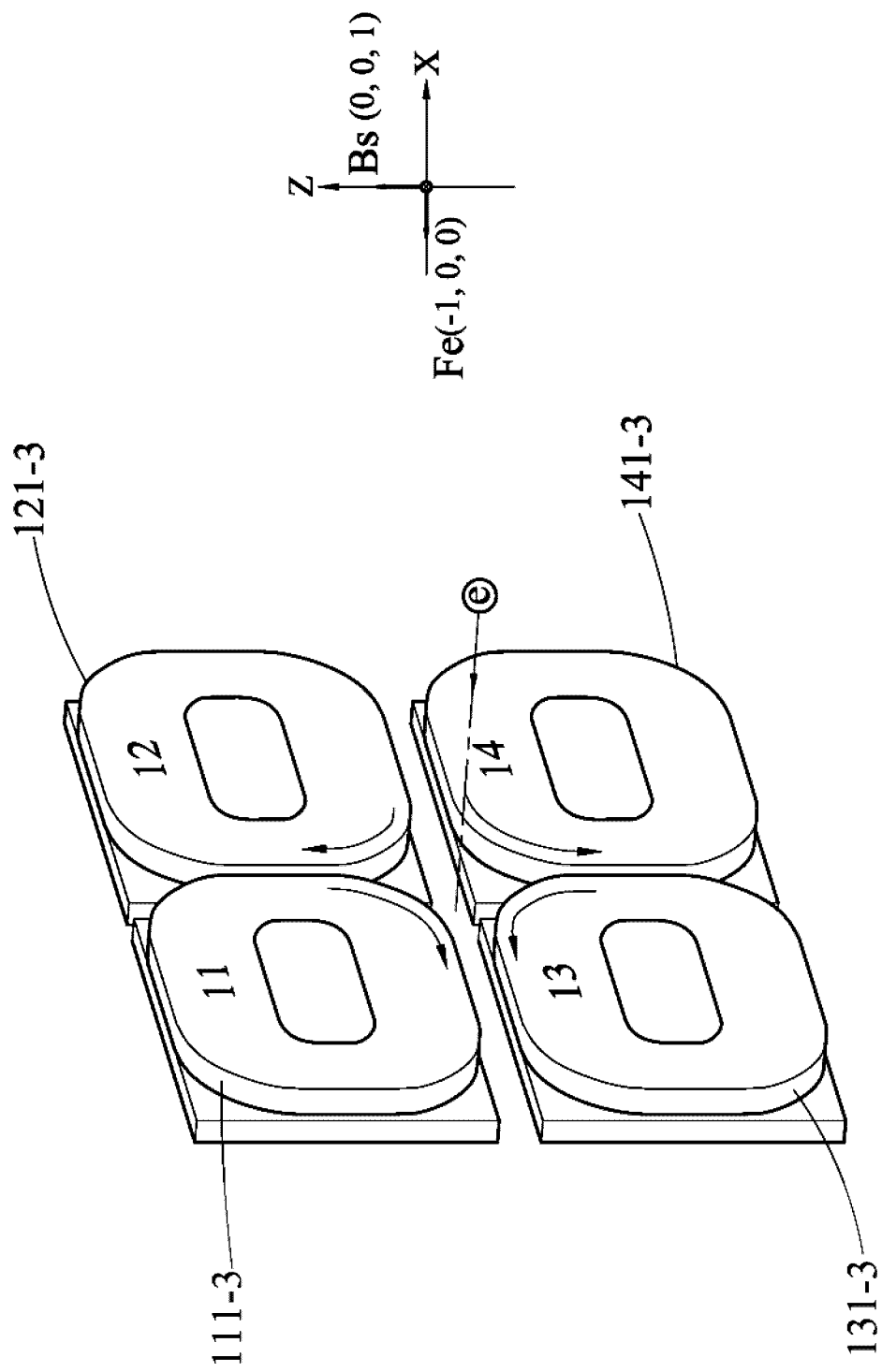
FIG. 7c is a third schematic diagram of right-hand circular polarization.

Referring to FIG. 7c, the undulator 1 is set as the above so that a first odd-numbered sequence coil 111-3, a second odd-numbered sequence coil 121-3, a third odd-numbered sequence coil 131-3, and a fourth odd-numbered sequence coil 141-3 generate current directions indicated by arrows. In this case, a direction of a vector sum of a magnetic field established by the third coils (111-3, 121-3, 131-3, and 141-3) of the magnetic pole arrays is (0, 0, 1). When the electron beam e reaches the first coils of the magnetic pole arrays along the electron beam passage 90, $F_e=-[(0, 1, 0)\times(0, 0, 1)=(-1, 0, 0)$. Therefore, the electron beam e is polarized along a direction of (-1, 0, 0).

Figure 7D:
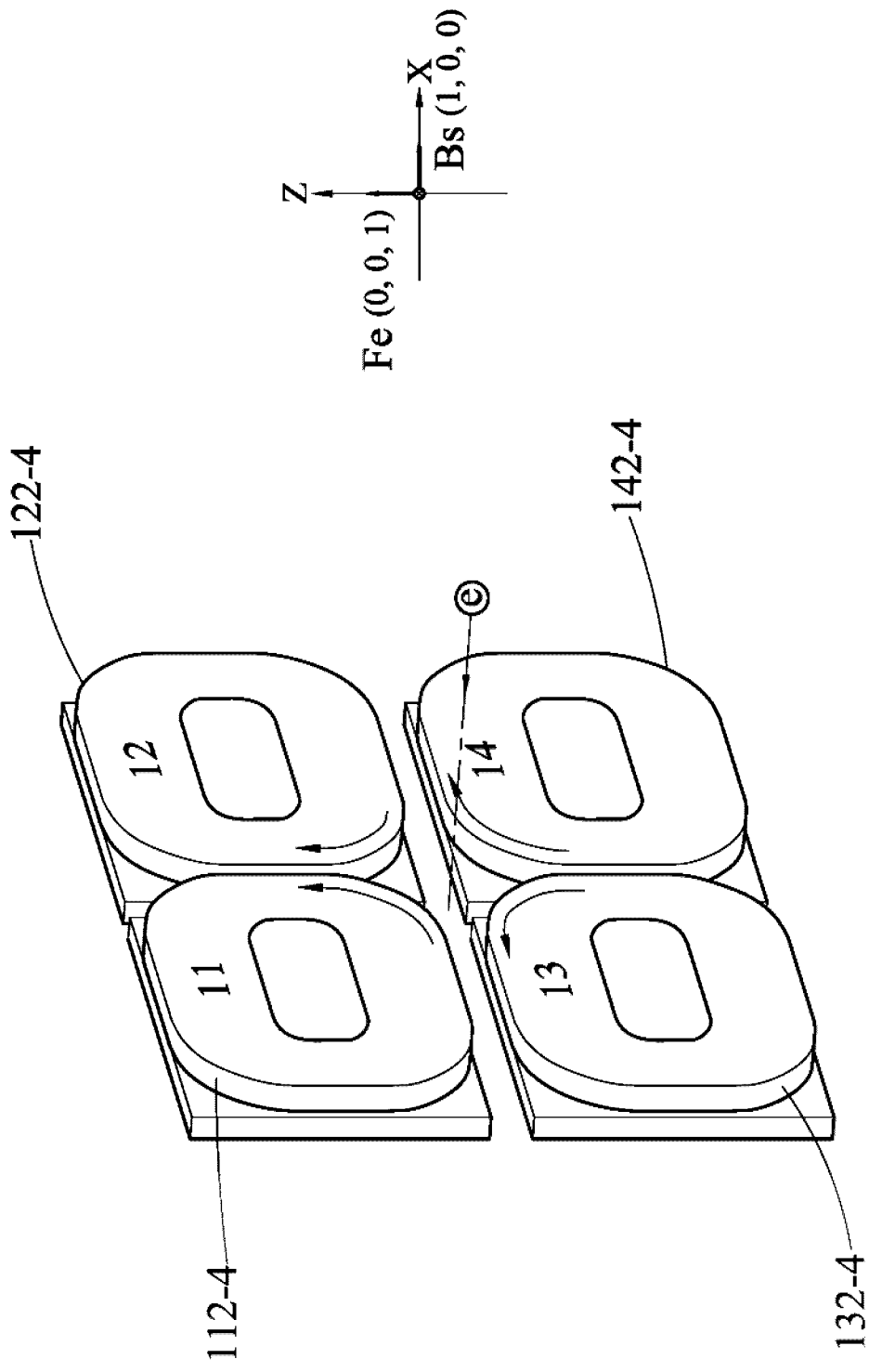
FIG. 7d is a fourth schematic diagram of right-hand circular polarization.

Referring to FIG. 7d, the undulator 1 is set as the above so that a first even-numbered sequence coil 112-4, a second even-numbered sequence coil 122-4, a third even-numbered sequence coil 132-4, and a fourth even-numbered sequence coil 142-4 generate current directions indicated by arrows. In this case, a direction of a vector sum of a magnetic field established by the second coils (112-4, 122-4, 132-4, and 142-4) of the magnetic pole arrays is (1, 0, 0). When the electron beam e reaches the second coils of the magnetic pole arrays along the electron beam passage 90, $F_e=-[(0, 1, 0)\times(1, 0, 0)=(0, 0, 1)$. Therefore, the electron beam e is polarized along a direction of (0, 0, 1).

To this point, the electron beam e has passed through one periodical length of the undulator 1. Subsequently, each time the electron beam e passes through the four coils of the magnetic pole arrays, the electron beam e repeatedly goes through the foregoing polarization process. When the electron beam e completely passes through the undulator 1, the electron beam e is polarized for six times in total. When facing the electron beam e, an observer may observe a traveling track of the electron beam e as shown in FIG. 7e and right-hand circular polarization is presented.

It should be particularly noted that in addition to the four linear polarization modes such as the 135° inclined linear polarization, the 45° inclined linear polarization, the horizontal and vertical linear polarization, and the like. In some embodiments, the undulator 1 may also implement linear polarization modes of various different inclined angles. The 135° inclined linear polarization is used as an example. If the condition is changed to $B_X < B_Z$, and the phase difference between $B_X$ and $B_Z$ also maintains original setting, to be specific, the phase difference $\Delta\phi$ between $B_X$ and $B_Z$ is zero (in phase), when facing the electron beam e, the observer may also observe that the traveling track of the electron beam e is presented as a straight line, and the straight line passes through a second quadrant, an original point, and a fourth quadrant. An inclined degree of the straight line depends on magnitudes of the magnetic fields Bx and Bz. If Bx>Bz, the straight line is relatively inclined to the Z-axis. To be specific, inclined linear polarization greater than 90° but less than 135° may be applied on the electron beam e, as shown in FIG. 8a. If Bx<Bz, the straight line is relatively inclined to the X-axis. To be specific, inclined linear polarization greater than 135° but less than 180° may be applied on the electron beam e, as shown in FIG. 8b.

Figure 8D:
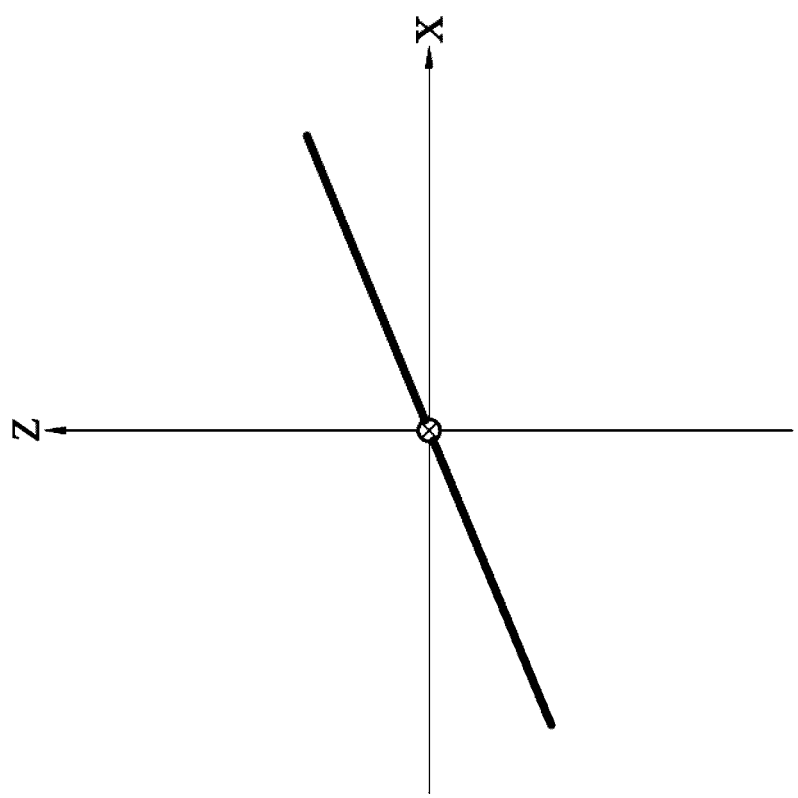
FIG. 8d is a schematic diagram of inclined linear polarization of an inclined angle greater than 0° but less than 45°.

Similarly, then the 45° inclined linear polarization is used as an example. If the condition is changed to $B_X \neq B_Z$, and the phase difference between $B_X$ and $B_Z$ also maintains original setting, to be specific, the phase difference $\Delta\phi$ between $B_X$ and $B_Z$ is zero (in phase), when facing the electron beam e, the observer may also observe that the traveling track of the electron beam e is presented as a straight line, and the straight line passes through a first quadrant, an original point, and a third quadrant. An inclined degree of the straight line depends on magnitudes of the magnetic fields Bx and Bz. If Bx>Bz, the straight line is relatively inclined to the Z-axis. To be specific, inclined linear polarization greater than 45° but less than 90° may be applied on the electron beam e, as shown in FIG. 8c. If Bx<Bz, the straight line is relatively inclined to the X-axis. To be specific, inclined linear polarization greater than 0° but less than 45° may be applied on the electron beam e, as shown in FIG. 8d.

In some embodiments, quantities of winding turns of coils of the undulator 1 for implementing the polarization modes are the same.

In some embodiments, the undulator 1 further includes at least one current source for providing a current for coils of the magnetic pole arrays and a plurality of switches for controlling whether the current flows into the coils. For example, the operation may be implemented by using only one current source and eight switches. To be specific, odd-numbered sequence coils of the magnetic pole arrays are formed by a same conducting wire or connected in series, and even-numbered sequence coils are formed by another conducting wire or connected in series. In this way, eight conducting wires (or eight coil groups) needs to be controlled. Then, as long as one first odd-numbered sequence switch is electrically connected to the current source and the first odd-numbered sequence coils 111 of the first magnetic pole array 11; one first even-numbered sequence switch is electrically connected to the current source and the first even-numbered sequence coils 112 of the first magnetic pole array 11; one second odd-numbered sequence switch is electrically connected to the current source and the second odd-numbered sequence coils 121 of the second magnetic pole array 12; one second even-numbered sequence switch is electrically connected to the current source and the second even-numbered sequence coils 122 of the second magnetic pole array 12; one third odd-numbered sequence switch is electrically connected to the current source and the third odd-numbered sequence coils 131 of the third magnetic pole array 13; one third even-numbered sequence switch is electrically connected to the current source and the third even-numbered sequence coils 132 of the third magnetic pole array 13; one fourth odd-numbered sequence switch is electrically connected to the current source and the fourth odd-numbered sequence coils 141 of the fourth magnetic pole array 14; and one fourth even-numbered sequence switch is electrically connected to the current source and the fourth even-numbered sequence coils 142 of the fourth magnetic pole array 14, whether the current flows into the coils of the magnetic pole arrays may be controlled by on or off of the switches, and the undulator 1 is enabled to set the various polarization modes.

To continue, the odd-numbered sequence coils and the even-numbered sequence coils of the magnetic pole arrays are respectively controlled by using an independent switch and therefore may be independently on or off. However, odd-numbered sequence coils or even-numbered sequence coils of a same magnetic pole array is simultaneously on or off.

In some embodiments, alternatively, coils at each location of each magnetic pole array may be controlled by an independent current source or an independent switch, but values of currents of the coils is relatively good to keep consistent as much as possible. To be specific, if the coils (for example, 111-1, 121-1, 131-1, and 141-1) at a same location of each magnetic pole array is provided with a current by a same group of current sources as much as possible, magnetic field strengths generated by the coils may be further ensured to keep consistent, so that a polarization result can more meet expectations.

In some embodiments, as shown in FIG. 1, an iron core (or a non-ferromagnetic material) 19 may be further passed through a center of each magnetic pole array, thereby improving the magnetic field strength.

The above describes, by using specific embodiments, how to form magnetic fields in different directions by changing current directions of the coils included in the magnetic pole arrays of the undulator 1, so that the electron beam e passing through the electron beam passage 90 of the undulator 1 can be polarized in preset polarization mode.

The concept of the present invention is not limited to being performed by using the undulator 1. In a broad sense, as long as four magnetic field generators are disposed around the periphery of the electron beam passage 90, each magnetic field generator includes a plurality of odd-numbered sequence magnetic field sources and a plurality of even-numbered sequence magnetic field sources, the odd-numbered sequence magnetic field sources and the even-numbered sequence magnetic field sources are disposed along the extension direction of the electron beam passage 90 in a staggered manner and spaced away from each other, then a phase difference of magnetic fields generated by two neighboring odd-numbered sequence magnetic field sources of each magnetic field generator is 180°, and a phase difference of magnetic fields generated by two neighboring even-numbered sequence magnetic field sources of each magnetic field generator is 180°, the electron beam e traveling through the electron beam passage 90 is polarized by controlling on or off of the odd-numbered sequence magnetic field sources and the even-numbered sequence magnetic field sources of each magnetic field generator.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An undulator, applicable to polarizing an electron beam that travels through an electron beam passage, and comprising:
   a first magnetic pole array, disposed at a periphery of the electron beam passage along an extension direction of the electron beam passage, and comprising a plurality of first odd-numbered sequence coils and a plurality of first even-numbered sequence coils, wherein the plurality of first odd-numbered sequence coils and the plurality of first even-numbered sequence coils are disposed along the extension direction of the electron beam passage in a staggered manner and spaced away from each other, winding directions of two neighboring first odd-numbered sequence coils are opposite, and winding directions of two neighboring first even-numbered sequence coils are opposite;
   a second magnetic pole array, disposed at the periphery of the electron beam passage along the extension direction of the electron beam passage, and comprising a plurality of second odd-numbered sequence coils and a plurality of second even-numbered sequence coils, wherein the plurality of second odd-numbered sequence coils and the plurality of second even-numbered sequence coils are disposed along the extension direction of the electron beam passage in a staggered manner and spaced away from each other, winding directions of two neighboring second odd-numbered sequence coils are opposite, and winding directions of two neighboring second even-numbered sequence coils are opposite;
   a third magnetic pole array, disposed at the periphery of the electron beam passage along the extension direction of the electron beam passage, and comprising a plurality of third odd-numbered sequence coils and a plurality of third even-numbered sequence coils, wherein the plurality of third odd-numbered sequence coils and the plurality of third even-numbered sequence coils are disposed along the extension direction of the electron beam passage in a staggered manner and spaced away from each other, winding directions of two neighboring third odd-numbered sequence coils are opposite, and winding directions of two neighboring third even-numbered sequence coils are opposite; and
   a fourth magnetic pole array, disposed at the periphery of the electron beam passage along the extension direction of the electron beam passage, and comprising a plurality of fourth odd-numbered sequence coils and a plurality of fourth even-numbered sequence coils, wherein the plurality of fourth odd-numbered sequence coils and the plurality of fourth even-numbered sequence coils are disposed along the extension direction of the electron beam passage in a staggered manner and spaced away from each other, winding directions of two neighboring fourth odd-numbered sequence coils are opposite, and winding directions of two neighboring fourth even-numbered sequence coils are opposite, wherein
   the first magnetic pole array, the second magnetic pole array, the third magnetic pole array, and the fourth magnetic pole array are parallel to each other and surround the electron beam passage together.

2. The undulator according to claim 1, wherein quantities of winding turns of the plurality of first odd-numbered sequence coils, the plurality of first even-numbered sequence coils, the plurality of second odd-numbered sequence coils, the plurality of second even-numbered sequence coils, the plurality of third odd-numbered sequence coils, the plurality of third even-numbered sequence coils, the plurality of fourth odd-numbered sequence coils, and the plurality of fourth even-numbered sequence coils are the same.

3. The undulator according to claim 1, wherein the undulator further comprises:
   a current source;
   a first odd-numbered sequence switch, electrically connected to the current source and the plurality of first odd-numbered sequence coils;
   a first even-numbered sequence switch, electrically connected to the current source and the plurality of first even-numbered sequence coils;
   a second odd-numbered sequence switch, electrically connected to the current source and the plurality of second odd-numbered sequence coils;
   a second even-numbered sequence switch, electrically connected to the current source and the plurality of second even-numbered sequence coils;
   a third odd-numbered sequence switch, electrically connected to the current source and the plurality of third odd-numbered sequence coils;
   a third even-numbered sequence switch, electrically connected to the current source and the plurality of third even-numbered sequence coils;
   a fourth odd-numbered sequence switch, electrically connected to the current source and the plurality of fourth odd-numbered sequence coils; and
   a fourth even-numbered sequence switch, electrically connected to the current source and the plurality of fourth even-numbered sequence coils.

4. The undulator according to claim 1, wherein the undulator further comprises a plurality of iron cores, respectively passed through centers of the first magnetic pole array, the second magnetic pole array, the third magnetic pole array, and the fourth magnetic pole array along the extension direction of the electron beam passage.

5. A method for polarizing an electron beam, applicable to polarizing an electron beam that travels through an electron beam passage, and comprising:
   disposing a first magnetic field generator, a second magnetic field generator, a third magnetic field generator, and a fourth magnetic field generator around a periphery of the electron beam passage, wherein each magnetic field generator comprises a plurality of the odd-numbered sequence magnetic field sources and a plurality of the even-numbered sequence magnetic field sources, and the odd-numbered sequence magnetic field sources and the even-numbered sequence magnetic field sources are disposed along an extension direction of the electron beam passage in a staggered manner and spaced away from each other;
   making current directions of two neighboring odd-numbered sequence magnetic field sources of each magnetic field generator opposite to each other, and making current directions of two neighboring even-numbered sequence magnetic field sources of the magnetic field generator also opposite to each other; and polarizing, by controlling on or off of the odd-numbered sequence magnetic field sources and the even-numbered sequence magnetic field sources of each magnetic field generator, the electron beam that travels through the electron beam passage.

6. The method for polarizing an electron beam according to claim 5, wherein the method is performing 45-degree inclined linear polarization on the electron beam that travels through the electron beam passage.

7. The method for polarizing an electron beam according to claim 5, wherein the method is performing 135-degree inclined linear polarization on the electron beam that travels through the electron beam passage.

8. The method for polarizing an electron beam according to claim 5, wherein the method is performing vertical linear polarization on the electron beam that travels through the electron beam passage.

9. The method for polarizing an electron beam according to claim 5, wherein the method is performing horizontal linear polarization on the electron beam that travels through the electron beam passage.

10. The method for polarizing an electron beam according to claim 5, wherein the method is performing circular polarization or elliptical polarization on the electron beam that travels through the electron beam passage.

* * * * *